US012696046B2

(12) United States Patent
Ng et al.

(10) Patent No.: US 12,696,046 B2
(45) Date of Patent: Jul. 28, 2026

(54) METHOD AND APPARATUS FOR COLLABORATIVE WI-FI LOCALIZATION

(71) Applicant: Samsung Electronics Co., Ltd., Suwon-si (KR)

(72) Inventors: Boon Loong Ng, Plano, TX (US); Wenxun Qiu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 376 days.

(21) Appl. No.: 17/693,182

(22) Filed: Mar. 11, 2022

(65) Prior Publication Data

US 2022/0295219 A1 Sep. 15, 2022

Related U.S. Application Data

(60) Provisional application No. 63/161,282, filed on Mar. 15, 2021.

(51) Int. Cl.
*H04W 4/021* (2018.01)
*H04W 4/06* (2009.01)
*H04W 84/12* (2009.01)

(52) U.S. Cl.
CPC ............. *H04W 4/021* (2013.01); *H04W 4/06* (2013.01); *H04W 84/12* (2013.01)

(58) Field of Classification Search
CPC ........ H04W 4/021; H04W 4/06; H04W 84/12
(Continued)

(56) References Cited

U.S. PATENT DOCUMENTS 8,078,194 B2 * 12/2011 Walley .................. H04H 60/44
370/332
9,001,659 B2 4/2015 Sun et al.
(Continued)

FOREIGN PATENT DOCUMENTS

CA 2933865 A1 * 12/2016 ........... G01S 5/0018
CN 104602338 A 5/2015
(Continued)

OTHER PUBLICATIONS

Paul D. Groves "Intelligent Urban Positioning using Multi-Constellation GNSS with 3D Mapping and NLOS Signal Detection" University College London, United Kingdom, 2012 (Year: 2012).*

(Continued)

*Primary Examiner* — Abdallah A El-Hage Hassan

(57) ABSTRACT

A system and method for residential position localization of a target device is provided. One or more wireless stations (STA) in a wireless network augment a location detection capability of an access point (AP). The method includes transmitting a request for localization information of a target device in a wireless communication network. The method also includes obtaining the localization information from a transmission device in the wireless communication network, the location information including multiple data points. The method also includes determining a score for each of the multiple data points, where the score is based on at least one of: line-of-sight detection or a measurement of a signal quality. The method also includes selecting one or more data points from the localization information based on the determined scores. The method further includes determining a location of the target device based on the selected data points.

20 Claims, 17 Drawing Sheets

(58) Field of Classification Search
USPC ........................................................ 705/7.15
See application file for complete search history.

(56) References Cited

U.S. PATENT DOCUMENTS

| | | | | |
|---|---|---|---|---|
| 10,194,273 | B2 | 1/2019 | Xie | |
| 10,393,531 | B2 * | 8/2019 | Mielenz | G01C 21/3848 |
| 10,823,840 | B2 | 11/2020 | Yang et al. | |
| 11,467,247 | B2 * | 10/2022 | Park | G06T 7/30 |
| 2009/0258658 | A1 * | 10/2009 | Edge | G01S 5/06 |
| | | | | 455/456.3 |
| 2014/0243017 | A1 | 8/2014 | Das et al. | |
| 2015/0100589 | A1 | 4/2015 | Hassan et al. | |
| 2015/0365790 | A1 * | 12/2015 | Edge | H04W 76/50 |
| | | | | 455/456.1 |
| 2016/0170005 | A1 * | 6/2016 | Pon | G01S 5/06 |
| | | | | 455/456.1 |
| 2016/0259032 | A1 * | 9/2016 | Hehn | G05D 1/101 |
| 2017/0180926 | A1 * | 6/2017 | Doherty | H04W 4/02 |
| 2018/0007516 | A1 * | 1/2018 | Ge | G01S 5/14 |
| 2018/0146325 | A1 * | 5/2018 | Gibson | H04W 64/003 |
| 2021/0127634 | A1 * | 5/2021 | Griffioen | G01S 1/08 |

FOREIGN PATENT DOCUMENTS

| | | | | | |
|---|---|---|---|---|---|
| CN | 110390057 A | * | 10/2019 | ............. | H04W 4/30 |
| CN | 111200785 A | | 5/2020 | | |
| CN | 111381267 A | * | 7/2020 | ........... | H04W 64/00 |
| CN | 113438736 A | | 9/2021 | | |
| EP | 4236506 A1 | * | 8/2023 | ........... | H04W 64/00 |
| WO | 2013166096 A1 | | 11/2013 | | |
| WO | WO-2016205948 A1 | * | 12/2016 | .......... | H04B 17/318 |
| WO | WO-2017182346 A1 | * | 10/2017 | ............. | H05B 47/11 |

OTHER PUBLICATIONS

International Search Report and Written Opinion of the International Searching Authority issued Jun. 13, 2022 regarding International Application No. PCT/KR2022/003556, 8 pages.
Chintalapudi, et al. "Ad-Hoc Localization Using Ranging and Sectoring", IEEE Infocomm, Mar. 2004. (11 pages).
Xie, et al. "mD-track: Leveraging Multi-Dimensionality in Passive Indoor Wi-Fi tracking," in Proc. MobiCom, 2019, pp. 8:1-8:16 (16 pages).

* cited by examiner

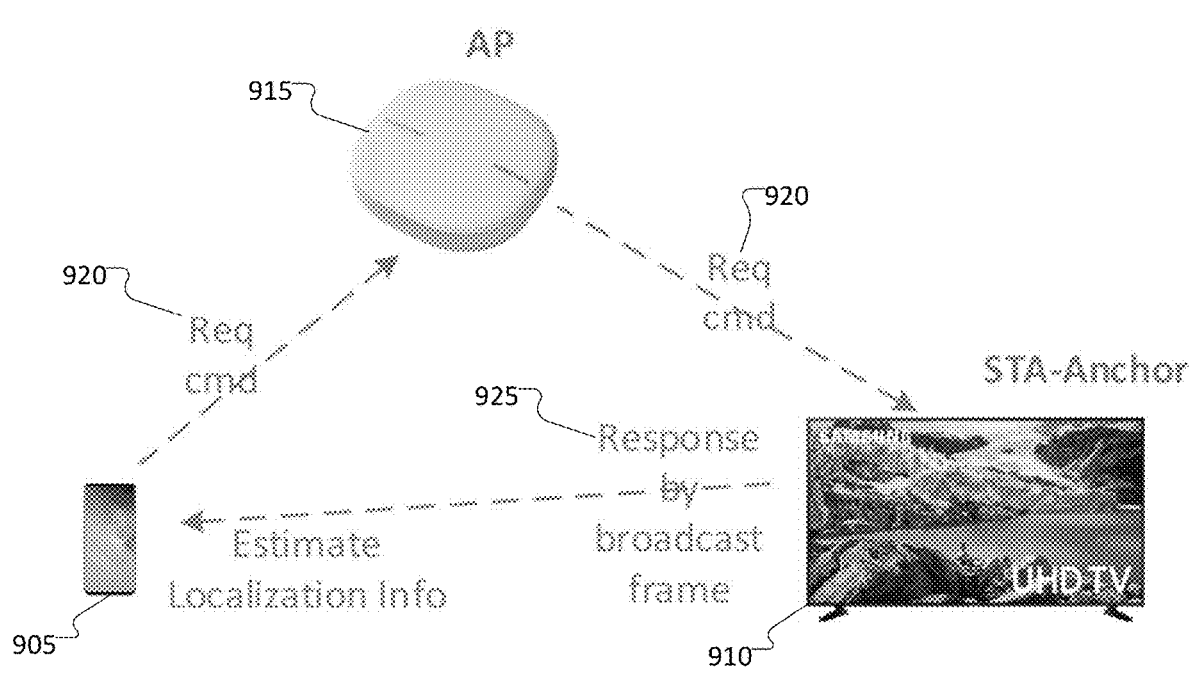
FIG. 9

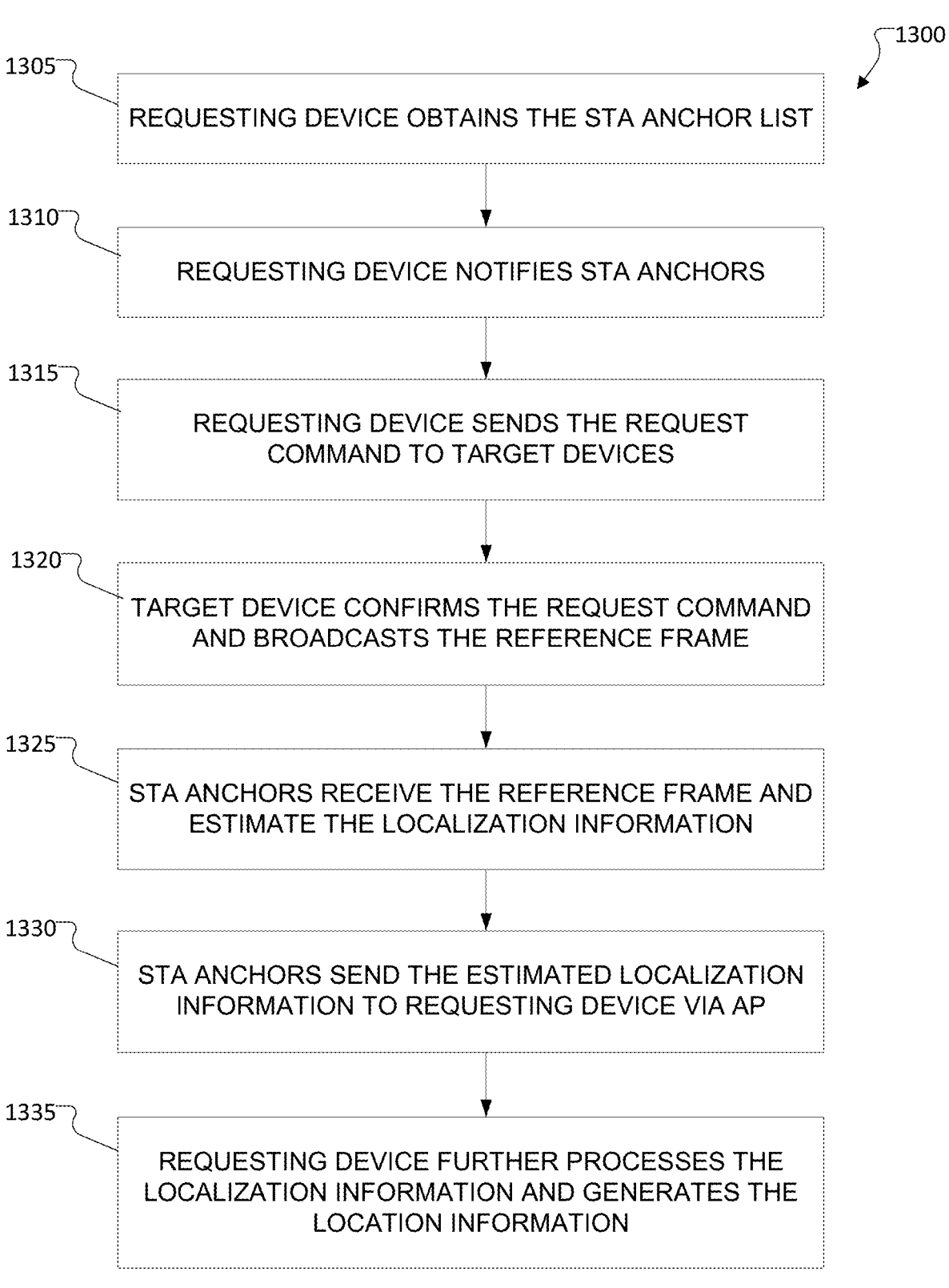

1300

1305 — REQUESTING DEVICE OBTAINS THE STA ANCHOR LIST

1310 — REQUESTING DEVICE NOTIFIES STA ANCHORS

1315 — REQUESTING DEVICE SENDS THE REQUEST COMMAND TO TARGET DEVICES

1320 — TARGET DEVICE CONFIRMS THE REQUEST COMMAND AND BROADCASTS THE REFERENCE FRAME

1325 — STA ANCHORS RECEIVE THE REFERENCE FRAME AND ESTIMATE THE LOCALIZATION INFORMATION

1330 — STA ANCHORS SEND THE ESTIMATED LOCALIZATION INFORMATION TO REQUESTING DEVICE VIA AP

1335 — REQUESTING DEVICE FURTHER PROCESSES THE LOCALIZATION INFORMATION AND GENERATES THE LOCATION INFORMATION

2005 — TRANSMIT REQUEST FOR LOCALIZATION INFORMATION OF TARGET DEVICE

2010 — OBTAIN LOCALIZATION INFORMATION FROM TRANSMISSION DEVICE

2015 — DETERMINE SCORE FOR EACH OF MULTIPLE DATA POINTS

2020 — SELECT ONE OR MORE DATA POINTS

2025 — DETERMINE LOCATION OF TARGET DEVICE

METHOD AND APPARATUS FOR COLLABORATIVE WI-FI LOCALIZATION

CROSS-REFERENCE TO RELATED APPLICATIONS AND CLAIM OF PRIORITY

The present application claims priority to U.S. Provisional Patent Application No. 63/161,282, filed on Mar. 15, 2021. The contents of the above-identified patent document are incorporated herein by reference.

TECHNICAL FIELD

The present disclosure relates generally to wireless communication systems and, more specifically, the present disclosure relates to a system and method for location positioning using collaborative Wi-Fi localization.

BACKGROUND

Mobile wireless communication devices are ubiquitous in society. With the evolution of the mobile communication devices, geographic location positioning is increasing in demand. For example, wireless technology can be used for localization of a mobile device. An example of an outdoor localization technology is the Global Positioning System (GPS). GPS may not be accurate for indoor areas.

SUMMARY

The present disclosure relates to wireless communication systems and, more specifically, the present disclosure relates to a system and method for location positioning using collaborative Wi-Fi localization.

In another embodiment, a method is provided. The method includes transmitting, by a requesting device to a reception device, a request for localization information of a target device in a wireless communication network. The method also includes obtaining the localization information from a transmission device in the wireless communication network, the location information including multiple data points. The method also includes determining a score for each of the multiple data points, where the score is based on at least one of: line-of-sight detection or a measurement of a signal quality. The method also includes selecting one or more data points from the localization information based on the determined scores. The method further includes determining a location of the target device based on the selected data points.

In one embodiment, an apparatus is provided. The apparatus includes a transceiver and a processor. The processor is configured to transmit, via the transceiver to a reception device, a request for localization information of a target device in a wireless communication network. The processor also is configured to obtain the localization information from a transmission device in the wireless communication network, the location information including multiple data points. The processor also is configured to determine a score for each of the multiple data points, where the score is based on at least one of: line-of-sight detection or a measurement of a signal quality. The processor also is configured to select one or more data points from the localization information based on the determined scores. The processor is further configured to determine a location of the target device based on the selected data points.

In yet another embodiment, a non-transitory computer readable medium is provided. The non-transitory computer readable medium a plurality of instructions that, when executed by a processor of an electronic device, cause the at least one processor to transmit, via the transceiver to a reception device, a request for localization information of a target device in a wireless communication network; obtain the localization information from a transmission device in the wireless communication network, the location information including multiple data points; determine a score for each of the multiple data points, where the score is based on at least one of: line-of-sight detection or a measurement of a signal quality; select one or more data points from the localization information based on the determined scores; and determine a location of the target device based on the selected data points.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a network with a STA anchor broadcasting reference packets according to embodiments of the present disclosure;

FIG. 13 illustrates a process for collaborative localization of a tag according to embodiments of the present disclosure;

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A localization of the tag or target based on range measurements from anchors can be implemented by APs in a Wi-Fi positioning system, using the Wi-Fi round trip time (RTT) standards such as IEEE 802.11mc or IEEE 802.11az. Due to the limited measurement bandwidth, the localization/positioning accuracy (or resolution) with Wi-Fi is typically >1 m, such as 5-15 m). Other methods of Wi-Fi positioning are also possible, such as signal strength based and fingerprinting based, although they are typically less accurate than the RTT (time of flight) based method. In a signal strength-based procedure, the range estimate can be derived from the received signal strength and a signal path-loss model, which is a function of the radio propagation distance between the transmitter and the receiver. The fingerprinting-based approach assumes the received signal strength or profile. In an at home scenario, APs may be distributed in a spatially sparse manner. This leads to few available AP anchors and relatively high absolute error in ranging. Consequently, a low number of AP anchors can hurt the localization accuracy, or reduce localization dimension achievable (e.g., 3D to 2D/1D, or 2D to 1D) due to the insufficient number of anchors.

If a STA device can be configured to play the anchor role, the localization accuracy could be improved. Furthermore, in-home devices usually are connecting to the same AP. Therefore, there is no need to perform channel scanning.

Embodiments of the present disclosure provide solution to enable STAs to become anchors and achieve STA anchor-based WiFi localization. According to certain embodiments, in the WiFi localization system, an AP can still be part of the anchors.

Figure 1:
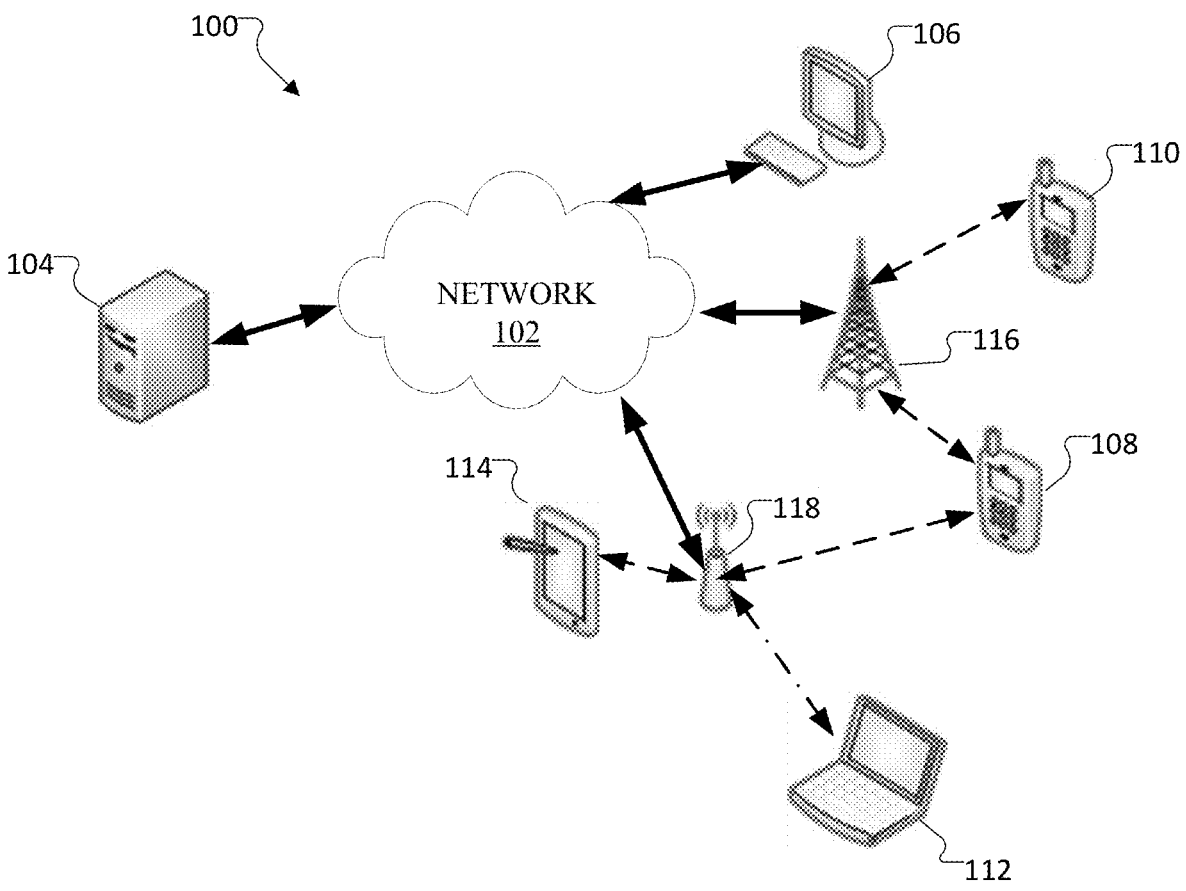
FIG. 1 illustrates an example wireless network according to embodiments of the present disclosure.
Figure 2:
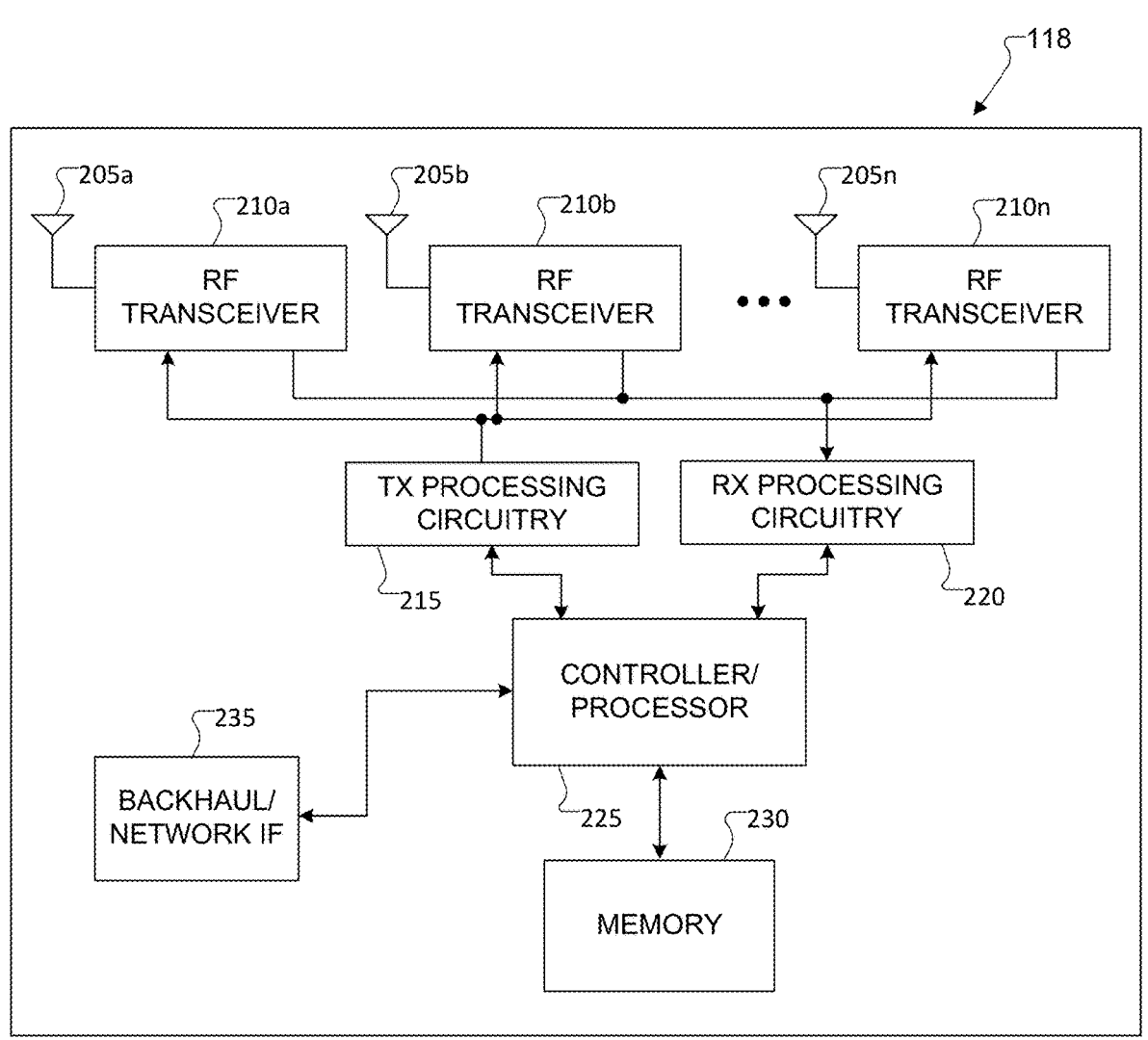
FIG. 2 illustrates an example access point (AP) according to embodiments of the present disclosure.
Figure 3:
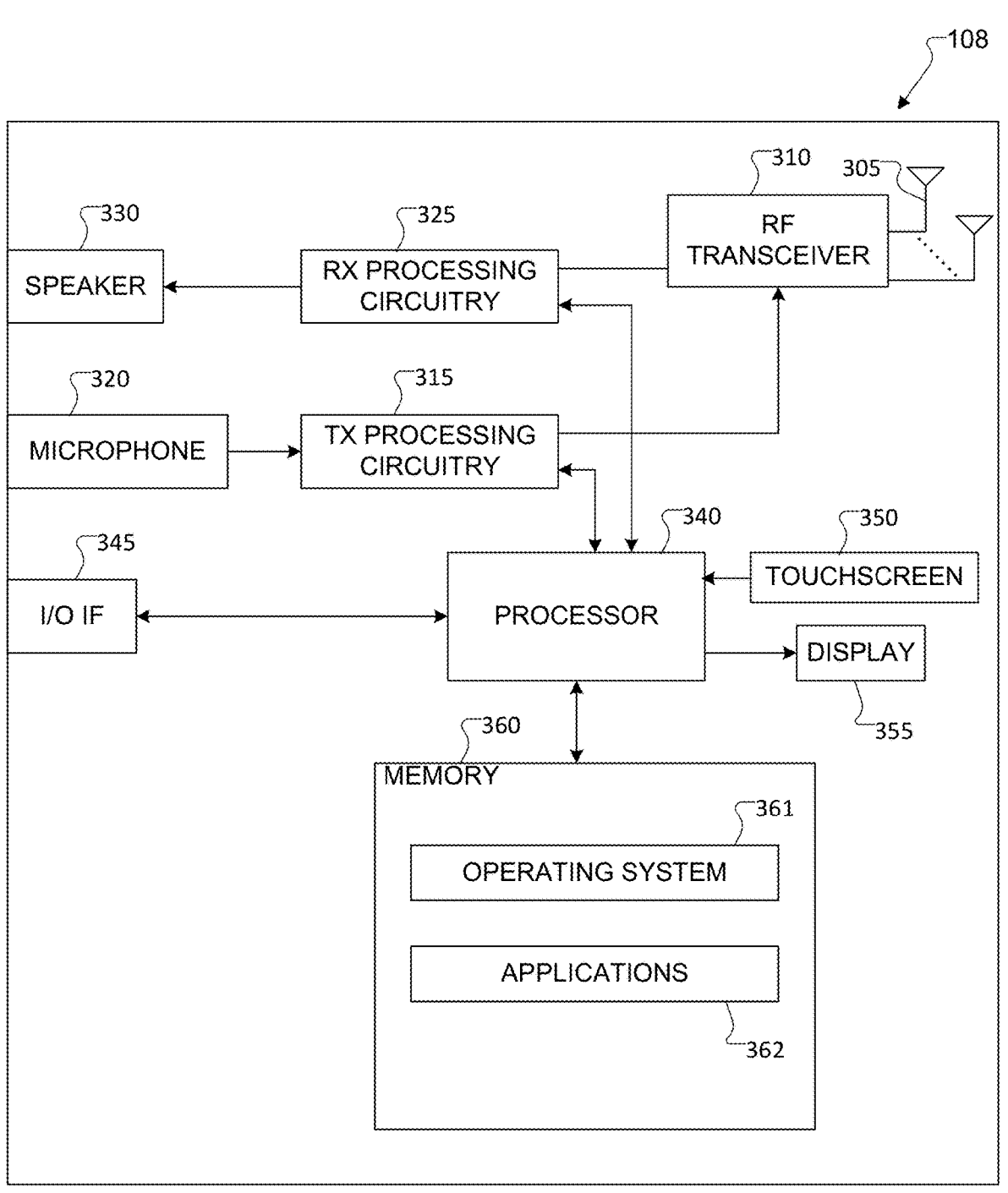
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various user equipments (UEs) 106-114. The UEs 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the UEs 106-114. Each server 104 could, for example, include one or more processing devices, one or more memories storing instructions and data, and one or more network interfaces facilitating communication over the network 102.

Each of the UEs 106-114 represent any suitable computing or processing device that interacts with at least one server (such as the server 104) or other computing device(s) over the network 102. The UEs 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver.

In this example, some UEs 108 and 110-114 communicate indirectly with the network 102. For example, the UEs 108 and PDA 110 communicate via one or more base stations 116, such as cellular base stations or eNodeBs (eNBs) or gNodeBs (gNBs). Additionally, mobile device 108 can communicate via one or more wireless access points 118. Also, the laptop computer 112 and the tablet computer 114 communicate via one or more wireless APs 118, such as IEEE 802.11 wireless access points. Note that these are for illustration only and that each of the UEs 106-114 could communicate directly with the network 102 or indirectly with the network 102 via any suitable intermediate device(s) or network(s). In certain embodiments, any of the UEs 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

FIG. 2 illustrates an example AP 118 according to embodiments of the present disclosure. The embodiment of the AP 118 illustrated in FIG. 2 is for illustration only. However, APs come in a wide variety of configurations, and FIG. 2 does not limit the scope of this disclosure to any particular implementation of an AP As shown in FIG. 2, the AP 118 includes multiple antennas 205a-205n, one or more RF transceivers 210a-210n, TX processing circuitry 215, and RX processing circuitry 220. The AP 118 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In certain embodiments, the UE 108 includes one or both of a WiFi receiver or a UWB receiver.

The controller/processor 225 can include one or more processors or other processing devices that control the overall operation of the AP 118. For example, the controller/processor 225 could control the reception of uplink signals and the transmission of downlink signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the AP 118 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the AP 118 to communicate with other devices or systems over a backhaul connection or over a network. The interface 235 could support communications over any suitable wired or wireless connection(s). For example, when the AP 118 is implemented as an access point, the interface 235 could allow the AP 118 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of AP 118, various changes may be made to FIG. 2. For example, the AP 118 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the AP 118 could include multiple instances of each (such as one per RF transceiver). Also, various components in FIG. 2 could be combined, further subdivided, or omitted and additional components could be added according to particular needs.

FIG. 3 illustrates an example UE 108 according to embodiments of the present disclosure. The embodiment of the UE 108 illustrated in FIG. 3 is for illustration only, and the UEs 106-114 of FIG. 1 could have the same or similar configuration. However, UEs come in a wide variety of configurations, and FIG. 3 does not limit the scope of this disclosure to any particular implementation of a UE.

As shown in FIG. 3, the UE 108 includes an antenna 305, a radio frequency (RF) transceiver 310, TX processing circuitry 315, a microphone 320, and receive (RX) processing circuitry 325. The UE 108 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data). In certain embodiments, the UE 108 includes one or both of a WiFi receiver or a UWB receiver.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. In certain embodiments, the UE 108 includes one or both of a WiFi transmitter (transceiver) or a UWB transmitter (transceiver).

The processor 340 can include one or more processors or other processing devices and execute the OS 361 stored in the memory 360 in order to control the overall operation of the UE 108. For example, the processor 340 could control the reception of uplink signals and the transmission of downlink signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 108 with the ability to connect to other devices, such as laptop computers and handheld computers. The I/O interface 345 is the communication path between these accessories and the processor 340.

The processor 340 is also coupled to the touchscreen 350 and the display 355. The operator of the UE 108 can use the touchscreen 350 to enter data into the UE 108. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 108, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 108 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 6G systems and frequency bands associated therewith is for reference as certain embodiments of the present disclosure may be implemented in 6G systems. However, the present disclosure is not limited to 6G systems, or the frequency bands associated therewith, and embodiments of the present disclosure may be utilized in connection with any frequency band.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
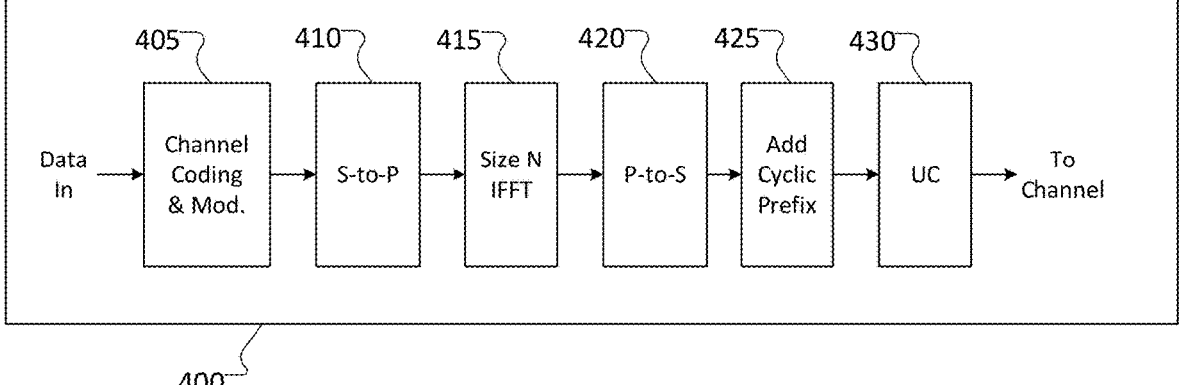
FIGS. 4 and 5 illustrate example wireless transmit and receive paths according to this disclosure.
Figure 5:
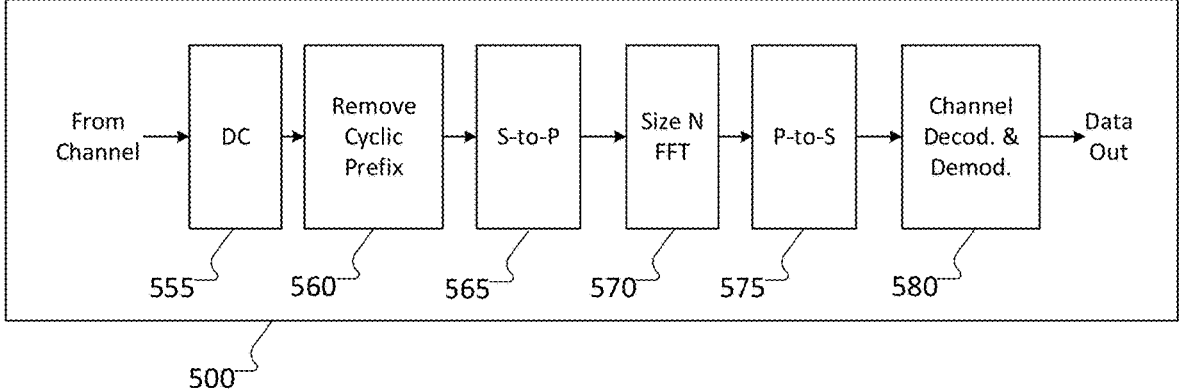

FIG. 4 and FIG. 5 illustrate example wireless transmit and receive paths according to this disclosure. In the following description, a transmit path 400 may be described as being implemented in a gNB (such as the gNB 116), while a receive path 500 may be described as being implemented in a UE (such as a UE 108). However, it may be understood that the receive path 500 can be implemented in a gNB and that the transmit path 400 can be implemented in a UE. In some embodiments, the receive path 500 is configured to support adapting a channel sensing threshold as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 116 and the UE 108. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 116 arrives at the UE 108 after passing through the wireless channel, and reverse operations to those at the gNB 116 are performed at the UE 108.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Wireless technology can be used for localization of a mobile device. As indicated herein above, an example of an outdoor localization technology is GPS. Examples of wireless technologies that can be used in indoor localization include Wi-Fi, such as a Wi-Fi based positioning system (WPS), BLUETOOTH, and UWB technologies.

Figure 6:
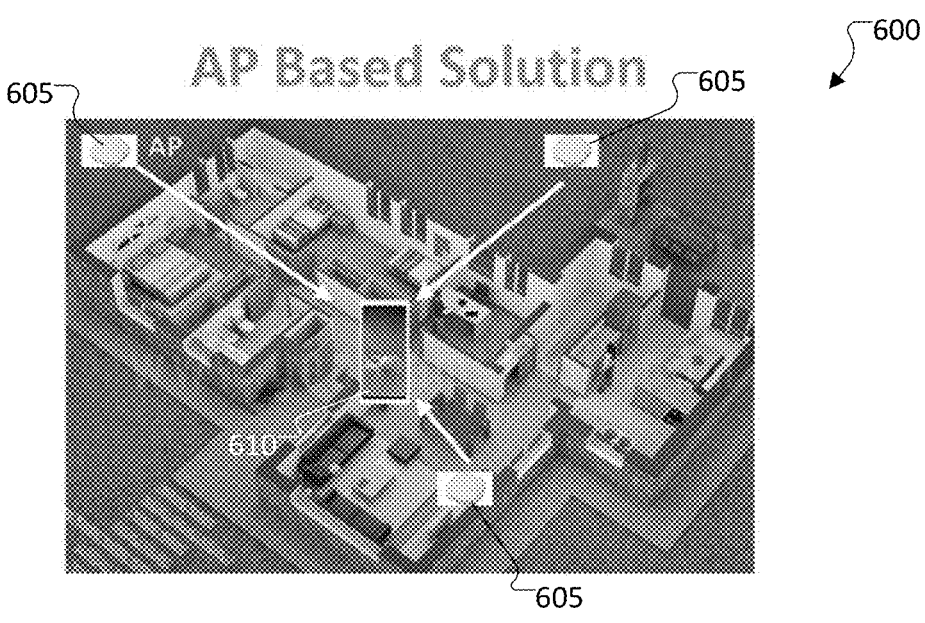
FIG. 6 illustrates an access point (AP) based location solution according to embodiments of the present disclosure.
Figure 7:
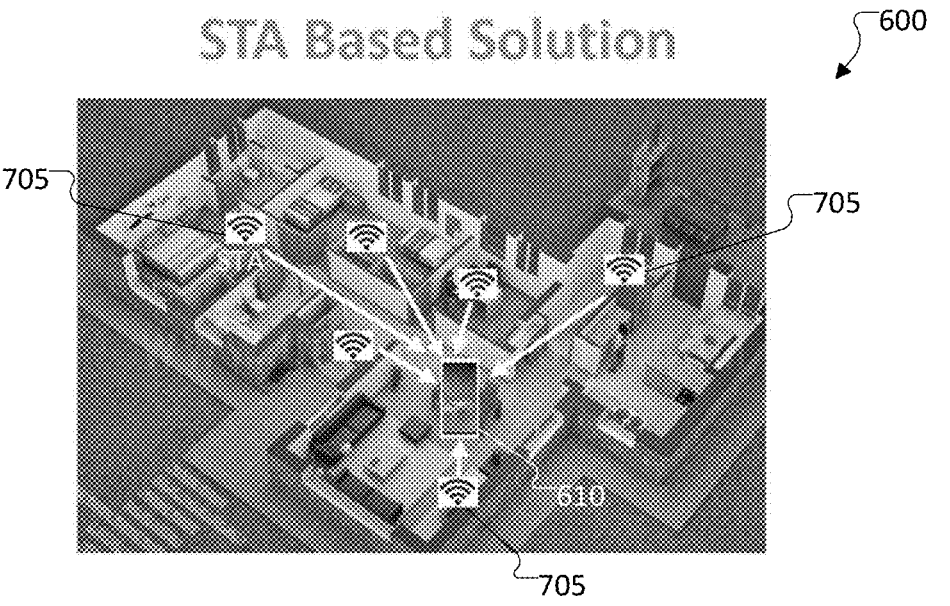
FIG. 7 illustrates a station (STA) based location solution according to embodiments of the present disclosure.

FIG. 6 illustrates an access point (AP) based location solution according to embodiments of the present disclosure. FIG. 7 illustrates a station (STA) based location solution according to embodiments of the present disclosure. The embodiments of the AP based location solution shown in FIG. 6 and STA based location solution shown in FIG. 7 are for illustration only. Other embodiments could be used without departing from the scope of the present disclosure.

In a Wi-Fi fingerprint-based localization solution, localization information (including the ranging or angle information) between access points (APs) and the target device (target device is the device that we want to locate) is used to perform the localization. The ranging information can be derivative of Received Signal Strength Indicator (RSSI) or time of flight (TOF) or channel state information (CSI), while the angle information could include angle of arrival (AOA) and angle of departure (AOD). Since Wi-Fi fingerprint-based localization is essentially based on the relative position between AP and target device, the accuracy is highly related to the AP position.

In the example shown in FIG. 6, a home network 600 may include one or more APs 605. The APs 605 may be distributed in a spatially sparse manner. Therefore, the home network 600 has few available AP anchors 605 and a relatively high absolute error in ranging. Consequently, the localization accuracy of the target device 610 may be negatively impacted and a localization dimension achievable (such as, three dimensional (3D) to two-dimensional (2D) or one-dimension (1D), or 2D to 1D) may be reduced due to the insufficient number of anchors 605. Additionally, in order to find sufficient APs 605 as anchors, a channel scan may be required, which can be time consuming and power consuming.

As shown in example depicted in FIG. 7, the home network 600 can include a number of Wi-Fi stations (STA) 705. The number of STAs 705 is usually much higher than the number of APs 605. Additionally, an STA 705 may be much closer, in distance, to a target device 610, such as UE 108, as compared with a distance from an AP 605 to UE 108. Therefore, there may be a higher chance for an STA 705 to be within line of sight (LOS) of the target device UE 108. Therefore, if one or more of the STAs 705 are enabled to perform anchor role, the localization accuracy of the target device 610, is improved. Furthermore, the in-home STAs 705 also connect to the same AP 605. Therefore, channel scanning does not need to be performed.

The STAs 705 do not periodically transmit packets as beacon. In order to estimate the localization information between an STA anchor and targeted device, a collaboration between STA anchor and targeted devices is enabled.

In an application layer protocol, such as IOT standard from open connectivity foundation (OCF), the targeted device 610 can discover one or more STAs 705 that can support a STA anchor function. With a STA anchor list, the collaborative localization protocol is configured to establish a link between an STA anchor and a targeted device such that the localization information can be estimated and exchanged among anchors and the targeted device.

Embodiments of the present disclosure provide for a collaborative localization protocol, an anchor location input, and a localization framework. Through the collaborative localization protocol, a target device and STA anchor can exchange data and estimate the localization information (ranging or/and angle information). The Anchor Location Input provides a system and a method to allow user input anchor location easily. A calibration step is also included. The Localization framework can provide a location framework to map the localization information to location information. The localization framework also includes the localization data point selection, and location information mapping.

Embodiments of the present disclosure further enable one or more STAs in a Wi-Fi network to become anchors that can be used to determine the location of a targeted device, such as a tag or UE 108. Enabling the STAs to operate as anchors can improve localization accuracy, which is in contrast to previous localization solutions in which APs are used as anchors, and thus are prone to high absolute error in ranging. Furthermore, by enabling the STAs to operate as anchors, the localization dimension achievable is increased (such as from 3D instead of 2D or 1D, or 2D instead of 1D) since greater number of anchors are available through the use of more numerous STA anchors (as compared to a few available AP anchors). Additionally, since the in-home STAs usually are connecting to the same AP, there is no need to do channel scanning with this solution. Accurate positioning can enable location-based services (especially in home scenarios) such as to provide high accuracy indoor navigation, device location determination, safety and monitoring in the home, location-enabled troubleshooting, and the like.

Certain embodiments provide a method, comprising: transmitting, by a target device, a request for localization information to a reception device in a wireless communication network; obtaining the localization information from a transmission device in the wireless communication network, the location information including multiple data points; attributing a score to each of the data points, where the score is based on line-of-sight detection and a measure of signal quality; selecting data points from the localization information based on the respective scores; and determining a location of the target device based on the selected data points. Certain embodiments provide a STA anchor device in the wireless communication network functions as the reception device and the transmission device, wherein the request for localization information is transmitted on a wireless channel established between the STA anchor device and the target device. Certain embodiments provide an AP in the wireless communication network is the reception device, and an STA anchor device in the wireless communication network is the transmission device. The AP can forward the request to the STA anchor device; and the STA anchor device transmits the localization information as a broadcast message that is intercepted by the target device. In certain embodiments, a STA anchor device in the wireless communication network is configured as the reception device, and an AP in the wireless communication network is configured as the transmission device. The target device can transmit the request as a broadcast message that is intercepted by the STA anchor. The STA anchor can transmit, in response to intercepting the broadcast message, the localization information to the AP. Additionally, the AP forwards the localization information to the target device.

Different from an AP, a STA device does not periodically transmit packets as beacon. In order to estimate the localization information between STA anchor and targeted device, collaboration between STA anchor and targeted devices is needed. First, in an application layer protocol, such as IOT standard from open connectivity foundation (OCF), the targeted device can discover the STA devices that are able to support STA anchor function. With the STA anchor list, the collaborative localization protocol is configured to setup and establish a link between an STA anchor and a targeted device so that the localization information can be estimated and exchanged among anchors and targeted device.

Figure 8:
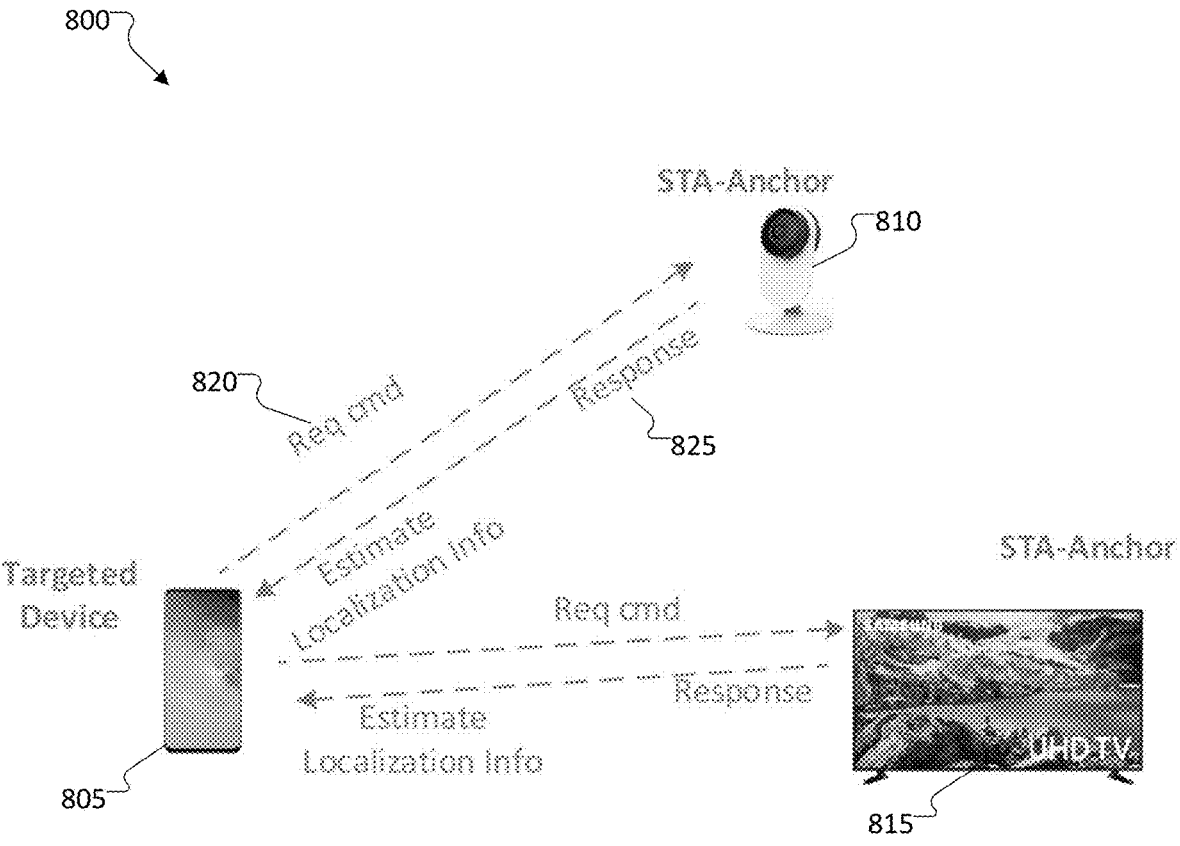
FIG. 8 illustrates a network with a direct link localization of a target device according to embodiments of the present disclosure.

FIG. 8 illustrates a network with a direct link localization of a target device according to embodiments of the present disclosure. The embodiment of the network 800 shown in FIG. 8 is for illustration only. Other embodiments could be used without departing from the scope of the present disclosure.

In certain embodiments, target device 805, such as UE 108, uses Tunneled Direct Link Setup (TDLS), or Wi-Fi direct, or soft AP mechanism to connect to a first STA anchor 810. Additionally, a direct data link exists between target device 805 and a second STA anchor 815. The STA anchors 810 and 815 can be any Wi-Fi station that is typically fixed or maintained in a single location, such as a television, a thermostat, a personal assistant, game box, sound system, appliance, camera, or the like.

In certain embodiments, when using TDLS or Wi-Fi direct, the target device 805 searches for the STA anchors 810, 815 that can support TDLS or Wi-Fi direct. After finding one or more STAs anchor 810, 815 that can support TDLS or Wi-Fi direct, the target device 805 sets up a point-to-point connection for each STA anchor 810 or 815, or both, such as by connected to each STA anchor 810 and 815, one STA anchor at a time. That is, the target device 805 establishes a point-to-point connection with a first STA anchor 810 then establishes a point-to-point connection with a second STA anchor 815.

In certain embodiments, when using a soft AP, the target device 805 needs to be associated with an original AP, to which all STA anchors 810, 815 are connected, and enable a soft AP function. The target device 805 sends (broadcasts) association command to the STA anchors 810, 815 to request each STA anchor 810, 815 to disassociate from original AP and associated with the soft AP, which is target device 805. In certain embodiments, a determination is made as to whether an STA anchor 810 or 815 is in a state in which the STA anchor 810 or 815 can disassociate from the original AP. For example, the second STA anchor 815 may be in a state in which the second STA anchor 815 is streaming data from a server and should not have the data stream interrupted. Once the association between soft AP (target device 805) and STA anchors 810, 815 is established, the data links between target device 805 and each of the STA anchors 810, 815 are established.

After the data link is established, the target device 805 sends a localization information request command 820 to the first STA anchor 810. In certain embodiments, the protocol to setup the data link, including localization information request command, can be an application layer protocol, which runs on top of a Wi-Fi protocol. The corresponding STA anchor, namely first STA anchor 810, responses by sending back a response packet 825. Based on the response packet 825, the target device 805 can estimate the localization information, including ranging information (e.g., RSSI, TOF, CSI) and angle information (e.g., AOA and AOD). In certain embodiments, the localization information is estimated using a long training field (LTF) in physical layer header of Wi-Fi packet transmitted by the first STA anchor 810. In certain embodiments, the first STA anchor 810 estimates the localization information from the localization information request command packet 820. The first STA anchor 810 then includes the localization information in the response packet 825 to target device 805. In certain embodiments, the target device 805 can decide whether to estimate the localization information or not. When target device 805 estimates the localization information as well, then bi-directional localization information can be used for location mapping.

Thereafter, the target device 805 repeats this procedure with additional STA anchors, such as the second STA anchor 815, until the target device 805 obtains enough data points or has received information from all the available STA anchors. After all STA anchors feedback the response, the STA anchors could disconnect the direct data link. In certain embodiments, when using a soft AP, the STA anchors 810, 815 can dis-associate with the soft AP (target device 805) and re-associate with the original AP.

The localization information request and response protocol can also include the AP and target device pair, to provide an additional data point. Including the AP and target device pair can be performed before or after the procedures with STA anchors 810, 815 have been completed. In the case of TDLS, Including the AP and target device pair can also be performed during the TDLS session as the target device 805 remains connected to the AP during the TDLS session.

The set of STAs to be considered as a STA anchor by the target device 805 can be selected according to a set of criteria, including one or more of: the STA's protocol capability, such as whether the required direct link technology is supported, the STA's PHY capability, such as whether TOF, AOA can be estimated, or the link quality between the target device and the STA, which can be measured in terms of RSSI, SNR or other link quality metrics. If a potential STA anchor is not available, such as when the STA is handling on-going traffic, or the STA is experiencing a high traffic load, the potential STA anchor may reject the request of the target device 805. The load or availability of the potential STA anchor can also be advertised so that the target device 805 does not attempt to include the corresponding STA as one of available or potential STA anchors.

FIG. 9 illustrates a network with a STA anchor broadcasting reference packets according to embodiments of the present disclosure. The embodiment of the network 900 shown in FIG. 9 is for illustration only. Other embodiments could be used without departing from the scope of the present disclosure.

In certain embodiments, communication between the target device 905 and a STA 910 occurs without direct data link. A solution using a direct data link requires either the target device 905 supports soft AP function or all STA anchors 910 and target device 905 support TDLS; however, not all Wi-Fi devices can meet this requirement. In certain embodiments, the STA anchors 910 and the target device 905 are still associated with the original AP 915. Therefore, as long as the devices support a Wi-Fi protocol, the collaborative localization protocol can be implemented. The avoidance of the need to disassociate with the original AP 915 also means that a method of in-direct data link incurs less overhead.

As shown in the example depicted in FIG. 9, the target device 905 selects one STA anchor 910 and sends the localization request command through the AP 915. The localization request command 920 is sent through AP 915 to the corresponding STA anchor 910. In certain embodiments, the localization request command 920 is an application layer protocol. In certain embodiments, the localization request command 920 is an existing transport layer or IP layer or MAC layer protocol. The localization request command 920 is configured to trigger the target device 905 to generating a response 925. After receiving the request command 920 packet, the corresponding STA anchor 910 sends a broadcast frame as the response 925. If the target device 905 is able to capture a frame that is not intended for the target device 905, then the STA anchor 910 is not required to send a broadcast frame, but can send any type of frame. By receiving the packet from STA anchor 910, the target device 905 can estimate the localization information. In certain embodiments, the target device 905 starts a wait-timer for a timeout (e.g., 100 ms) for the target device 905 to wait for the response 925 from the corresponding STA anchor 910. For example, the target device 905 can send an automatic repeat request (ARQ) request to all the STAs via AP 915, and then the target device 905 sets itself to a sniffer mode. Then each STA anchor 910 will send a response 925 to the ARQ request. When the target device 905 is in sniffer mode, the target device 905 can capture the frame from each STA anchor 910 and estimate the localization information accordingly. In certain such embodiments, the ARQ request operates as the localization information request command 920. In certain embodiments, the target device 905 repeats this procedure with other STA anchors 910 until the target device 905 obtains enough data points or receives responses 925 from all the STA anchors 910.

Figure 10:
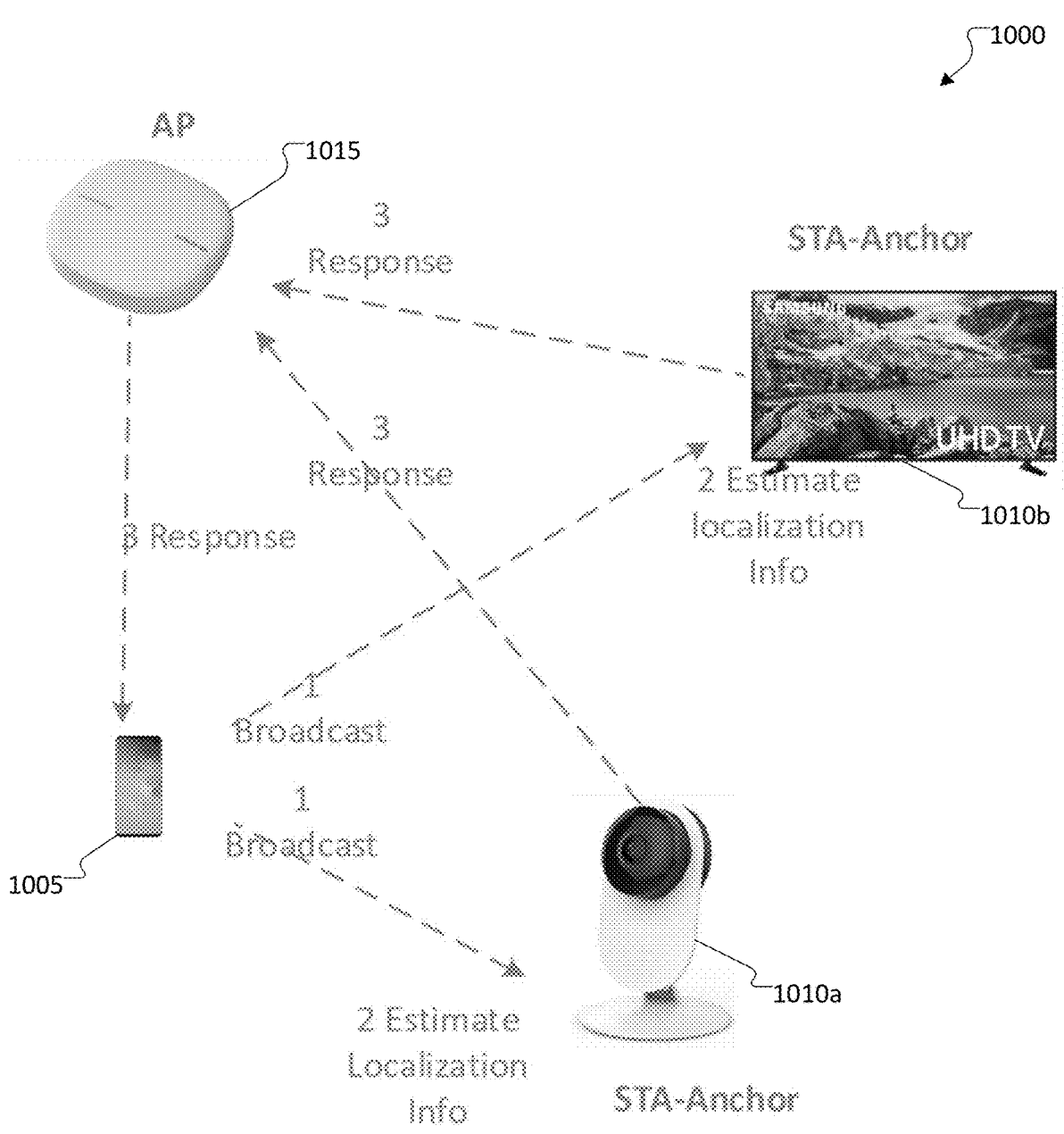
FIG. 10 illustrates a network with a target device broadcasting a request command according to embodiments of the present disclosure.

FIG. 10 illustrates a network with a target device broadcasting a request command according to embodiments of the present disclosure. The embodiment of the network 1000 shown in FIG. 10 is for illustration only. Other embodiments could be used without departing from the scope of the present disclosure.

In certain embodiments, the target device 1005 broadcasts a signal instead of the STA anchors 1010*a*, 1010*b*. As shown in FIG. 10, in step 1, the target device 1010 broadcasts a request packet to request localization information from STA anchors 1010*a* and 1010*b*. In certain embodiments, following transmission of the request packet, the target device 1005 optionally broadcasts a reference packet. In step 2, all STA anchors 1010*a*, 1010*b* estimate localization information in response to the request packet or the following reference packet. Then, in step 3, the estimated localization information is sent from STA anchors 1010*a*, 1010*b* through the original AP 1015 to the target device 1005 as response to the request packet. The responses by the STA anchors 1010*a*, 1010*b* can be sent one by one. In certain embodiments, the target device 905 starts a wait-timer for a timeout (e.g., 500 ms) for receiving the localization information.

Figure 11:
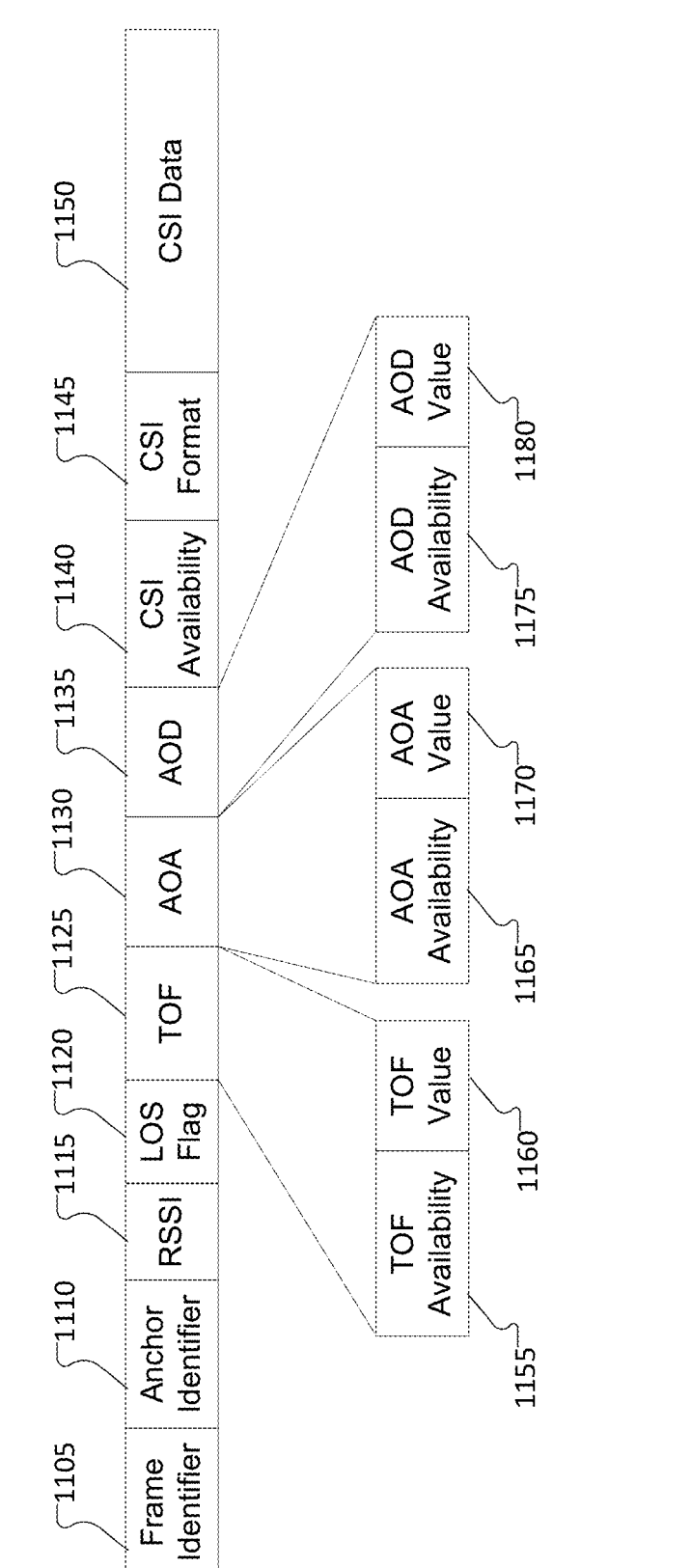
FIG. 11 illustrates a localization information response frame according to embodiments of the present disclosure.

FIG. 11 illustrates a localization information response frame according to embodiments of the present disclosure. The embodiment of the frame format 1100 shown in FIG. 11 is for illustration only. Other embodiments could be used without departing from the scope of the present disclosure.

In the example localization information response frame format 1100 shown in FIG. 11, the MAC layer header and physical layer header are excluded here. The frame format 1100 includes the frame identifier 1105, anchor identifier 1110, RSSI field 1115, LOS Flag 1120, TOF field 1125, AOA field 1130, AOD field 1135, CSI field, which includes CSI availability 1140, CSI format 1145, and CSI data 1150. The frame identifier 1105 identifies this frame as a localization information response frame. The anchor identifier 1110 identifies the corresponding anchor to which this frame is corresponds. The received signal strength indicator (RSSI) value 1115 is mandatory. The LOS flag 1120 includes an indicator regarding LOS. This LOS flag 1120 indicator can be "true" or "false" or "not available". If the anchor detects the channel between targeted device and corresponding anchor is LOS, then this field is "true". If the anchor detects the channel is not LOS, then this field is "false". If the anchor does not have the capability to detect LOS, then this field is "not available". The TOF field 1125 includes a TOF availability field 1155 and a TOF value field 1160. If the anchor is able to provide the TOF value, then it would set TOF availability 1155 to "true" and append the value in the TOF value field 1160. Otherwise, the TOF availability field 1155 is "false". The AOA field 1130 AOA availability field 1165 and an AOA value field 1170. If the anchor is able to provide AOA value, then the anchor would set the AOA availability field 1165 to "true" and append the value in the AOA value field 1170. Otherwise, the AOA availability field 1165 is "false". The AOD field 1135 includes AOD availability field 1175 and an AOD value field 1180. If the anchor is able to provide AOD value, then the anchor would set AOD availability field 1175 to "true" and append the value in the AOD value field 1180. Otherwise, the AOD availability field 1175 is "false". The CSI Availability field 1140 indicates the availability of CSI data. If CSI is appended in the frame, then the CSI Availability field 1140 is set to "true". Otherwise, the CSI Availability field 1140 is set to "false". The CSI format field 1145 includes the CSI data format, such number of antennas, number of subcarriers, and the like. This CSI format field 1145 is optional. When CSI availability is "true", the CSI format field 1145 is available; otherwise the CSI format field 1145 is unavailable. The CSI data field 1150 is the CSI data. The CSI data field 1150 is optional as well. When CSI availability is true, the CSI data field 1150 is available; otherwise the CSI data field 1150 is unavailable.

Figure 12:
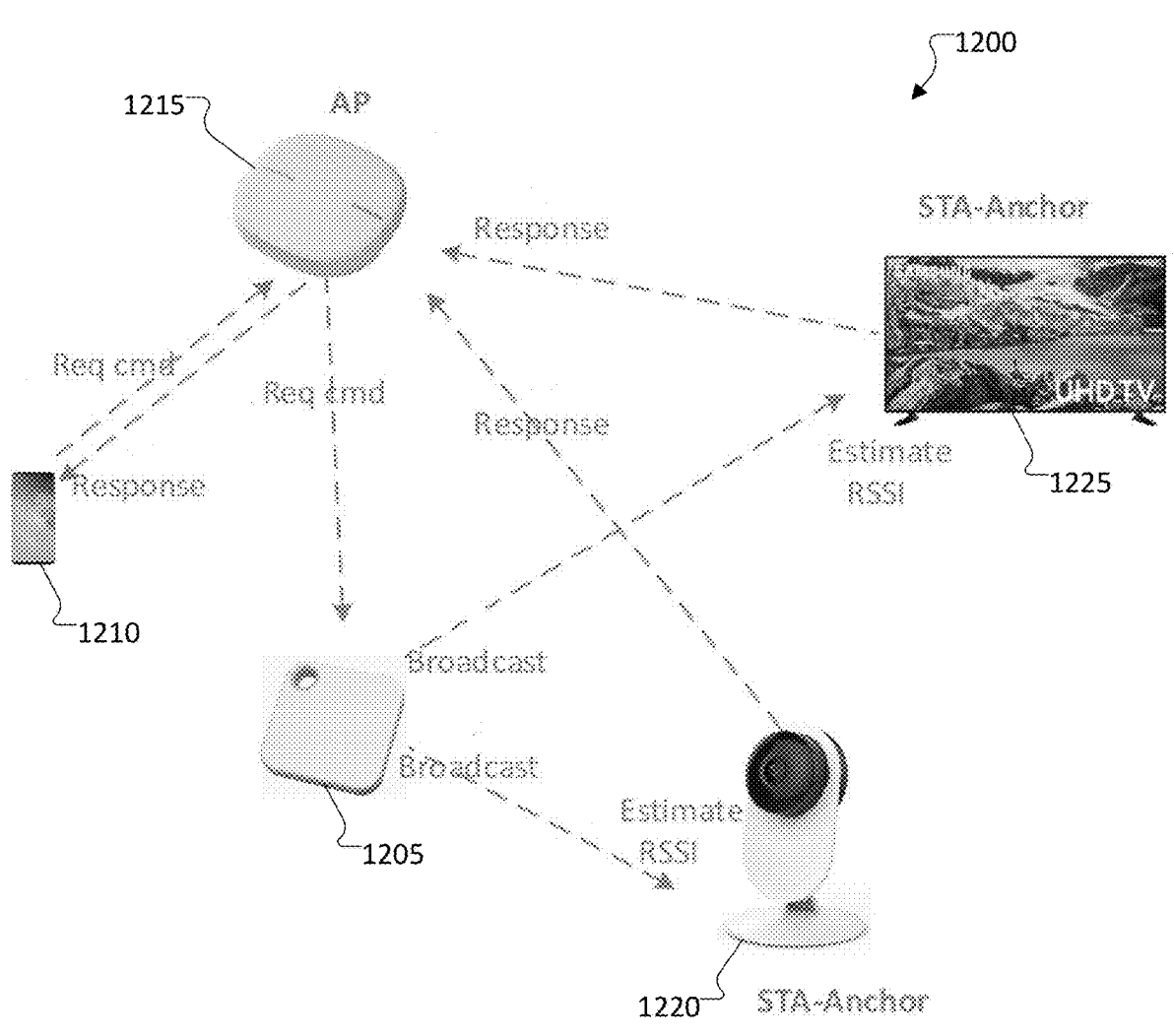
FIG. 12 illustrates a network for localization of a tag according to embodiments of the present disclosure.

FIG. 12 illustrates a network for localization of a tag according to embodiments of the present disclosure. The embodiment of the network 1200 shown in FIG. 12 is for illustration only. Other embodiments could be used without departing from the scope of the present disclosure. In certain embodiments, process for collaborative localization of a tag is performed via the network 1200.

FIG. 13 illustrates a process for collaborative localization of a tag according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server, a STA, or a mobile device.

In certain embodiments, a process for collaborative localization can support a Wi-Fi tag application, such as in the network 1200 shown in FIG. 12. In the network 1200, the target device 1205 is a tag, such as a Wi-Fi tag. Although a Wi-Fi tag is depicted, the target device 1205 can be any suitably arranged Wi-Fi capable device, such as a phone, tablet, ear-phones, glasses, head mounted display, game system, and so forth. A requesting device 1210 can be a smart device, such as UE 108, which requests a location of the target device 1205. The requesting device 1210 can be local or remote providing that the requesting device 1210 is able to access AP 1215. For example, the requesting device 1210 can be located within a home housing the network 1200 and connected, such as via a Wi-Fi connection to AP 1215. Alternatively, the requesting device 1210 can be remoted located, such as at a business or shopping center, or the like, and remotely connected to the AP 1215 via a cellular or backhaul network. In the example shown in FIG. 12, the requesting device 1210 is on the same local area network (LAN) as target device 1205, first STA anchor 1220 and second STA anchor 1225. In certain embodiments, the target device 1205 and the requesting device 1210 need not be within a signal range of each other.

To locate the target device 1205, the requesting device 1210 initiates a collaborative localization process 1300. For example, an operator of UE 108 may be searching for his keys, which he knows have a Wi-Fi tag on the key ring. The operator of UE 108 activates a location application, which executes the collaborative localization process 1300 and the operator, via UE 108, specifies that the target device 1205 is the Wi-Fi tag associated with his keys.

In operation 1305, the requesting device 1210 confirms an existence of a corresponding WiFi tag as the target device 1205 and obtains an STA anchors list via an application layer protocol, such as by using an Open Connectivity Foundation (OCF) protocol to discover the devices with localization capability. In operation 1310, the requesting device 1210 notifies all STA anchors, including first STA anchor 1220 and second STA anchor 1225, to enable the STA anchors to prepare to receive a packet from the target device 1210. In the notification, the requesting device 1210 can pass target device identification information, such as a Wi-Fi Tag identification information, to first STA anchor 1220 and second STA anchor 1225 so that the STA anchors 1220, 1225 can identify the packets from corresponding target device 1205. In operation 1315, the requesting device 1210 sends a request command to the target device 1205 via AP 1215. In operation 1320, the target device 1205 confirms a reception of request command and broadcasts the reference packet. In operation 1325, the STA anchors that received reference packet estimate the localization information according to their capability. For example, if STA anchor 1220 receives the packet, the STA anchor 1220 can use a Wi-Fi fingerprint-based localization solution or LOS, if so equipped. In certain embodiments, the AP 1215 is also able to operate as an STA anchor and estimate localization information according to its own capability. In operation 1330, the STA anchors that received reference packet then send a response packet back to the requesting device 1210 via AP 1215. The response frame format can be as the frame format 1100 shown in FIG. 11. In operation 1335, the requesting device 1210 receives, within a pre-defined timeout, such as 500 ms, one or more response from the STA anchors 1220, 1225 that performed the localization estimation. The further process the raw data and generate the location information.

Figure 14:
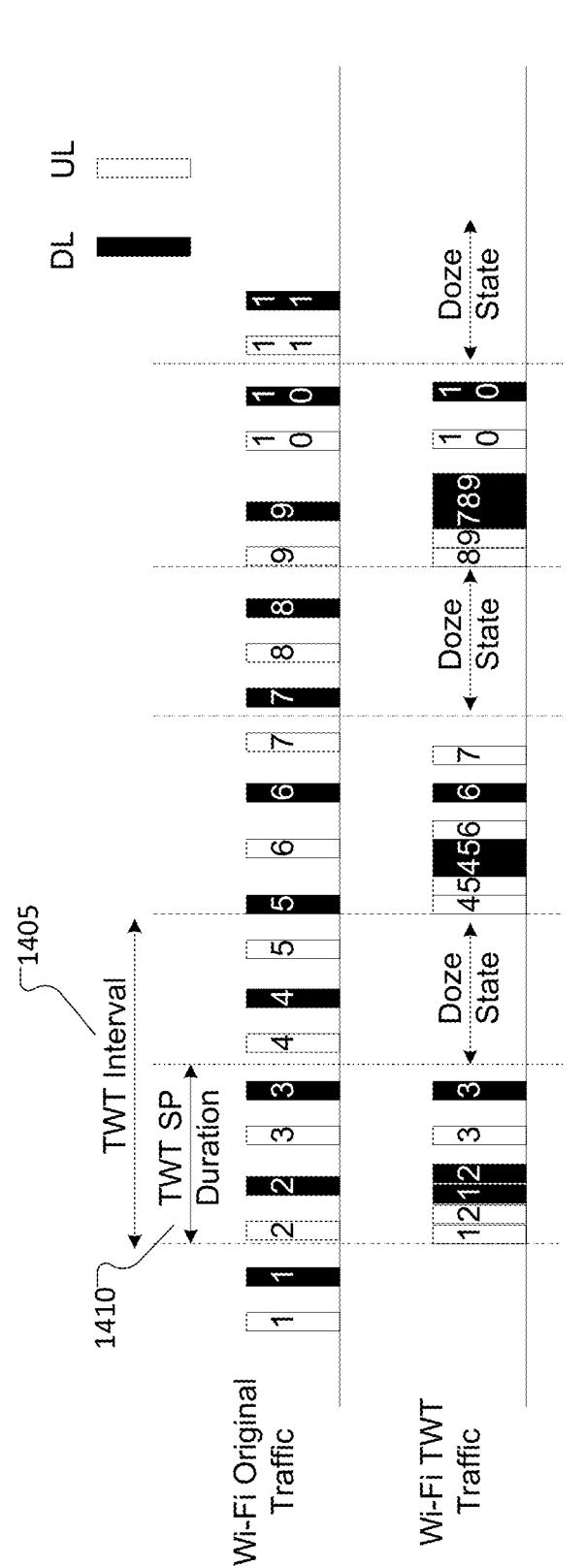
FIG. 14 illustrates an example target wake time (TWT) according to embodiments of the present disclosure.

FIG. 14 illustrates an example target wake time (TWT) according to embodiments of the present disclosure. The embodiment of the TWT 1400 shown in FIG. 14 is for illustration only. Other embodiments could be used without departing from the scope of the present disclosure.

Since a Wi-Fi tag is normally driven by battery, a low power feature is advantageous. In certain embodiments, to save power, a target wake time (TWT) feature can be applied to the link between AP 1215 and Wi-Fi tag (target device 1205). In the TWT protocol, there are two parameters in TWT agreement negotiation: TWT interval 1405 and SP duration 1410. The TWT interval 1405 can be set as a constant value, which satisfies the system response requirement, such as 100 ms. The TWT SP duration 1410 can be set as:

$$T_{sp}=\max\{T_{sp,min},T_{data}+T_{Guard}\} \quad (1)$$

where $T_{sp,min}$ is the minimal SP duration supported by the hardware, $T_{Guard}$ is constant (e.g., $T_{Guard}$=1 ms) and $T_{data}$ is defined as:

$$T_{data} = a_0 * \left(\frac{L_{TX}}{R_{TX}} + \frac{L_{RX}}{R_{RX}}\right) \quad (2)$$

$$a_0 = \left(\frac{RadioOn}{RadioOn - CCA} \cdot \alpha + 1 - \alpha\right) \quad (3)$$

Here, $L_{RX}$ is the packet size of request packet from requesting device to Wi-Fi tag (target device 1205), and $L_{TX}$ is the packet size of request confirmation packet. Therefore, both $L_{RX}$ and $L_{TX}$ are constant. $R_{TX}$ and $R_{Rx}$ are effective TX data rate and RX data rate, which can be obtained by F*LinkSpeed. Here, F is a constant factor, e.g., F=2.5. RadioOn is the radio on time in the observation window, CCA is the busy time when doing clear channel access in the observation window. The value for $$\frac{RadioOn}{RadioOn - CCA}$$

reflects the congestion of the network.

Additionally, a is an empirical constant value, e.g., α=1.9. Considering the Wi-Fi tag may not have the capability to perform a complex calculation, $a_0$ can be simplified as a constant value, e.g., $a_0$=3.5, which is corresponding to reasonable high congestion network condition.

As the renegotiation would also consume significant power, in certain embodiments, a check whether the SP value needs to be change is performed every N second (e.g., N=6 second). When the AP RSSI value changes regions, the SP value is recalculated. The RSSI range is divided into K regions (e.g., K=4). An example of region division is as:

Region 1: below −73 dBm;
Region 2: [−77 dBm, −65 dBm]
Region 3: [−70 dBm, −55 dBm]
Region 4: −60 dBm and above There is some overlapping on adjacent regions. This is to avoid the region fluctuation.

Figure 15A:
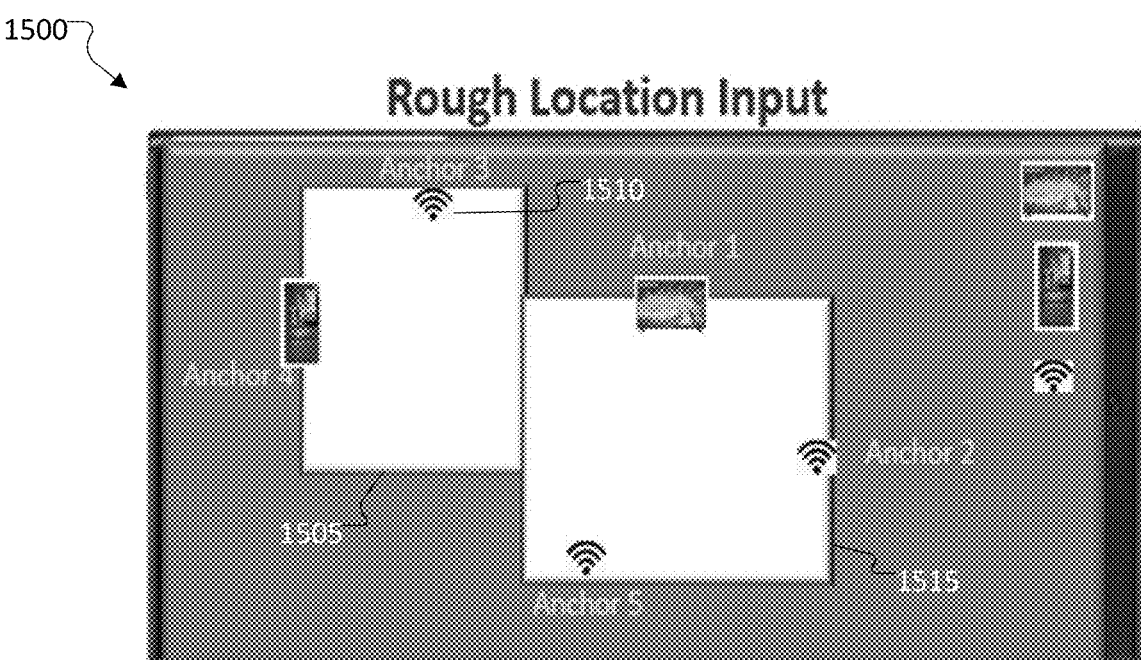
FIGS. 15A and 15B illustrate an example for anchor location input according to embodiments of the present disclosure.
Figure 15B:
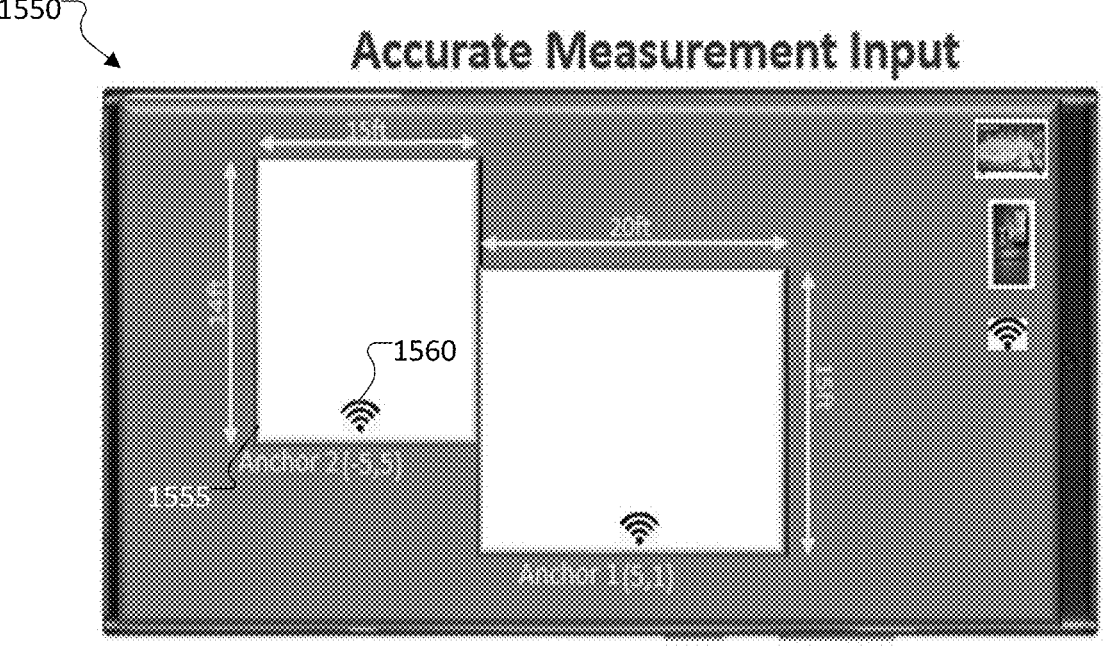

FIGS. 15A and 15B illustrate an example for anchor location input according to embodiments of the present disclosure. The embodiments of the anchor location input shown in FIGS. 15A and 15B are for illustration only. Other embodiments could be used without departing from the scope of the present disclosure. As illustrated in FIGS. 15A and 15B, the user's input of the anchor locations can be performed on a graphical user interface of a mobile device such as the smart phone or tablet, or on a smart home hub device, or any device with graphical user interface.

To obtain accurate or absolute location information of the target device, then accurate or actual location information of the anchors is important. In certain embodiments of the present disclosure, a user interface (UI) is provided to enable the user to input specific anchor locations.

In the example shown in FIG. 15A, a first anchor location input UI and method for rough location input are depicted. The first UI and method can be referenced as a rough location input 1500. In the rough location input 1500, the user can simply draw a rectangle 1505 to represent a room. The ratio of the height and width on the rectangle 1505 can be treated as the ratio of height and width for the physical room. Then user can drag an icon 1510 and place the icon 1510 roughly in the corresponding position in the room. The anchor ID can be tied with the IP address or can be aligned with the identification that is obtained by the application protocol, which is used to discover the localization capability (e.g., OCF protocol). The user can also draw a second rectangle 1515 to represent another room, and so forth, to create a rough floor plan of the house or building for the LAN. In the rough location input 1500 method, there may be no absolute location. That is, the location is relative location.

In the example shown in FIG. 15B, a second anchor location input UI and method for accurate measurement input are depicted. The second anchor location input UI and method can be referenced as an accurate measurement input 1550. In the accurate measurement input 1550, the user inputs actual or accurate dimensions of the room and the specific location of the anchor 1560. Similar to the rough location input 1500, the anchor 1560 ID can be tied to its IP address or aligned with the application layer protocol ID. In this case, the estimated target device location is an ab solute location.

Since each STA anchor may be manufactured by different manufacturers, it is possible that the transmission power for each STA anchor is different. In certain embodiments, when the STA anchors send the reference packet, a calibration process is utilized. In the calibration, the user places the target device as close to the corresponding anchor as possible. The target device then requests the anchor to send the reference packet. The target device records the RSSI as a reference RSSI. This reference RSSI will be used in the localization process.

Figure 16:
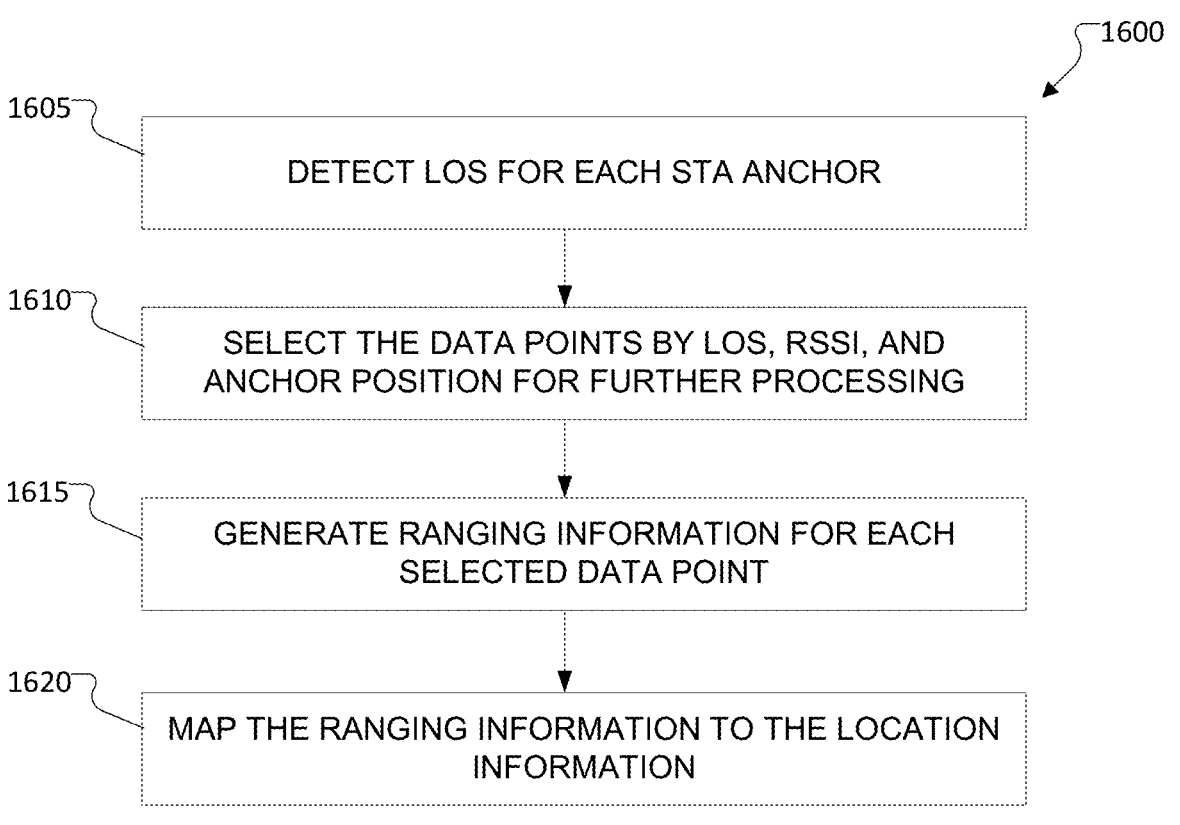
FIG. 16 illustrates a process of collaborative localization according to embodiments of the present disclosure.

FIG. 16 illustrates a process of collaborative localization according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process 1600 depicted in the example depicted is implemented by a processor in a server, a STA, or a mobile device.

After the target device or the requesting device receives the localization information from anchors, the respective device (the target device or the requesting device) starts processing data as shown in FIG. 16. In certain embodiments, the anchor can be an STA anchor, as well as AP anchor. For ease of explanation, the device that processes the data is referenced as processing device.

In operation 1605, the processing device detects a LOS for each STA anchor. The processing device can check each data point (the localization data from one anchor) is from a LOS channel or not. For example, the processing device can use an LOS detection process as shown in FIG. 17.

Figure 17:
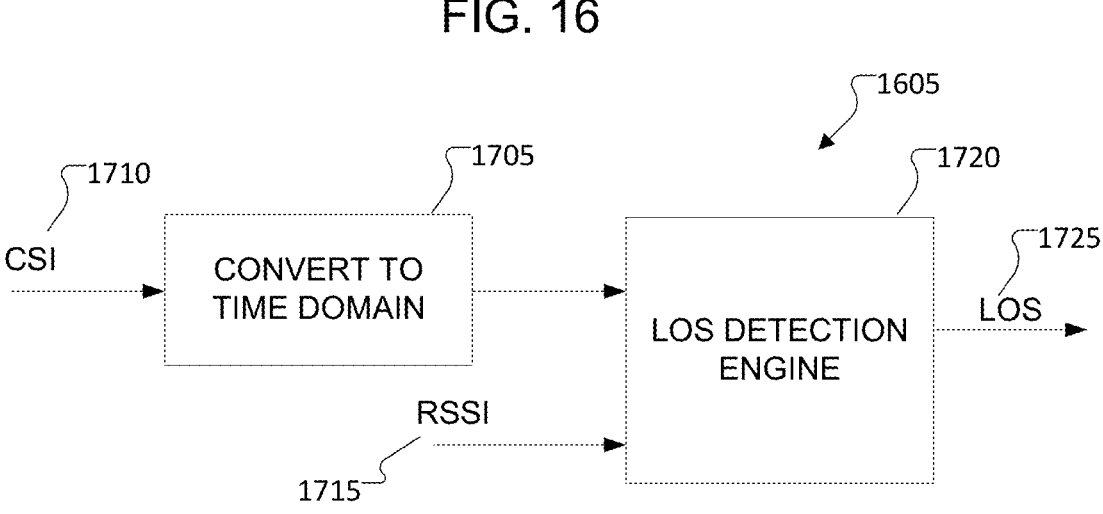
FIG. 17 illustrates a line of sight (LOS) detection according to embodiments of the present disclosure.

FIG. 17 illustrates a line of sight (LOS) detection according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process 1605 depicted in the example depicted is implemented by a processor in a server, a STA, or a mobile device.

The detection in operation 1605 requires CSI information and RSSI information. If the CSI information is not available, then the LOS detection cannot be performed. In LOS detection engine 1705 CSI information 1710 is converted to time domain by Discrete Fourier Transform (DFT) or Fast Fourier Transform (FFT) operation if the CSI information is in frequency domain. Channel impulse response is the time domain channel information. Then the time domain channel information together with RSSI information 1715 are input to LOS detection engine 1720. LOS detection engine 1705 is a pre-trained machine learning engine, such as a random forest, multilayer perceptron, or the like. The LOS detection engine 1720 provides a LOS detection result 1725, such as whether or not the data point is from a LOS channel.

Returning to FIG. 16, in operation 1610, the processing device selects data points by LOS, RSSI, and anchor position for further processing. For example, the processing device can execute a process for data point selection as shown in FIG. 18.

Figure 18:
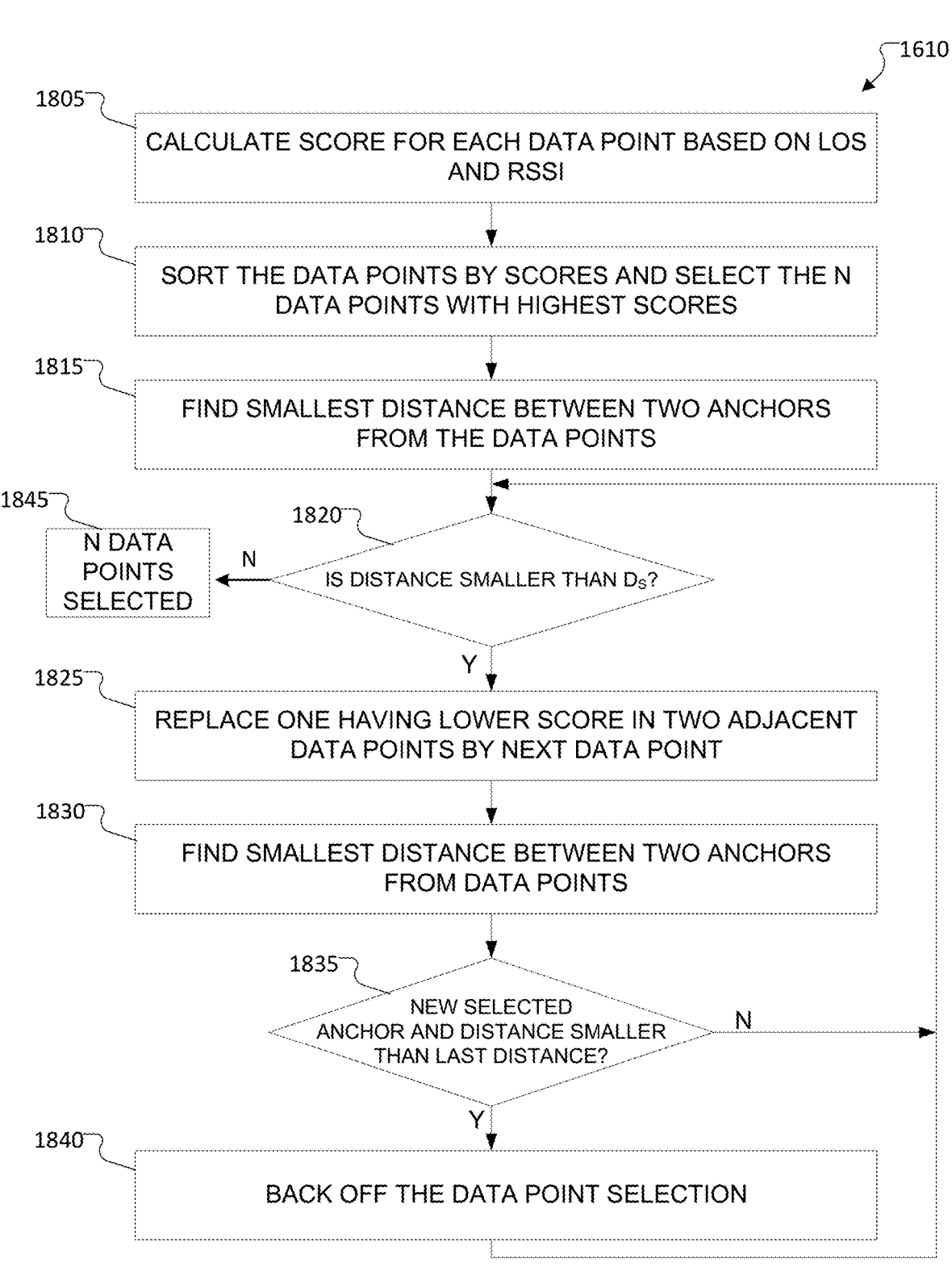
FIG. 18 illustrates a process for data point selection according to embodiments of the present disclosure.

FIG. 18 illustrates a process for data point selection according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process 1610 depicted in the example depicted is implemented by a processor in a server, a STA, or a mobile device.

In certain examples, there may be too many data points or some of the data points are not suitable for accurate localization. Therefore, a filtering on the data point may be necessary. For LOS, the LOS data point is preferred. For RSSI value, stronger RSSI value is preferred. For the anchor position, it is preferred to be well distributed in the room.

In operation 1805, the processing device calculates the score for each data point based on LOS and RSSI. The data points score is calculated from RSSI value and LOS status according to:

$$S = S_{rssi} + S_{Los} \tag{4}$$

where $S_{rssi}$ is the assigned score by RSSI value and $S_{LOS}$ is the assigned score by LOS status. For $S_{rssi}$, the processing device can directly assign the RSSI dB value. For $S_{Los}$, the following formula (e.g., K=10) can be used:

$$S_{Los} = \begin{cases} K, \ LOS \\ 0, \ \text{Otherwise} \end{cases} \tag{5}$$

In operation 1810, the processing device sorts the data points by their score. Assuming N data points are to be selected, the processing device selects the N data points with highest scores. In operation 1815, the processing device checks a distance between two anchors. In certain embodiments, the criterion is to enlarge the minimal distance. In operation 1820, if the minimal distance is smaller than a pre-defined threshold $D_s$ (e.g., 1 m) and one or more data points that have never been checked (once the data point are included in the N data point, it is called "checked") remain, then, in operation 1825, the processing device replaces the data point with the lower score in the pair, which provides the minimal distance, by the next unchecked data point. Otherwise, in operation 1845, the current N data points will be the selected data points for operation 1610. After replacing the data point in operation 1820, the processing device re-checks the minimal distance again in operation 1830. In operation 1835, if the minimal distance is smaller than the previous minimal distance, then the processing device backs off the replacement in operation 1840. The processing device repeats operations 1820-1835 until a minimal distance is no less than $D_s$ or all the data points have been checked.

Figure 19:
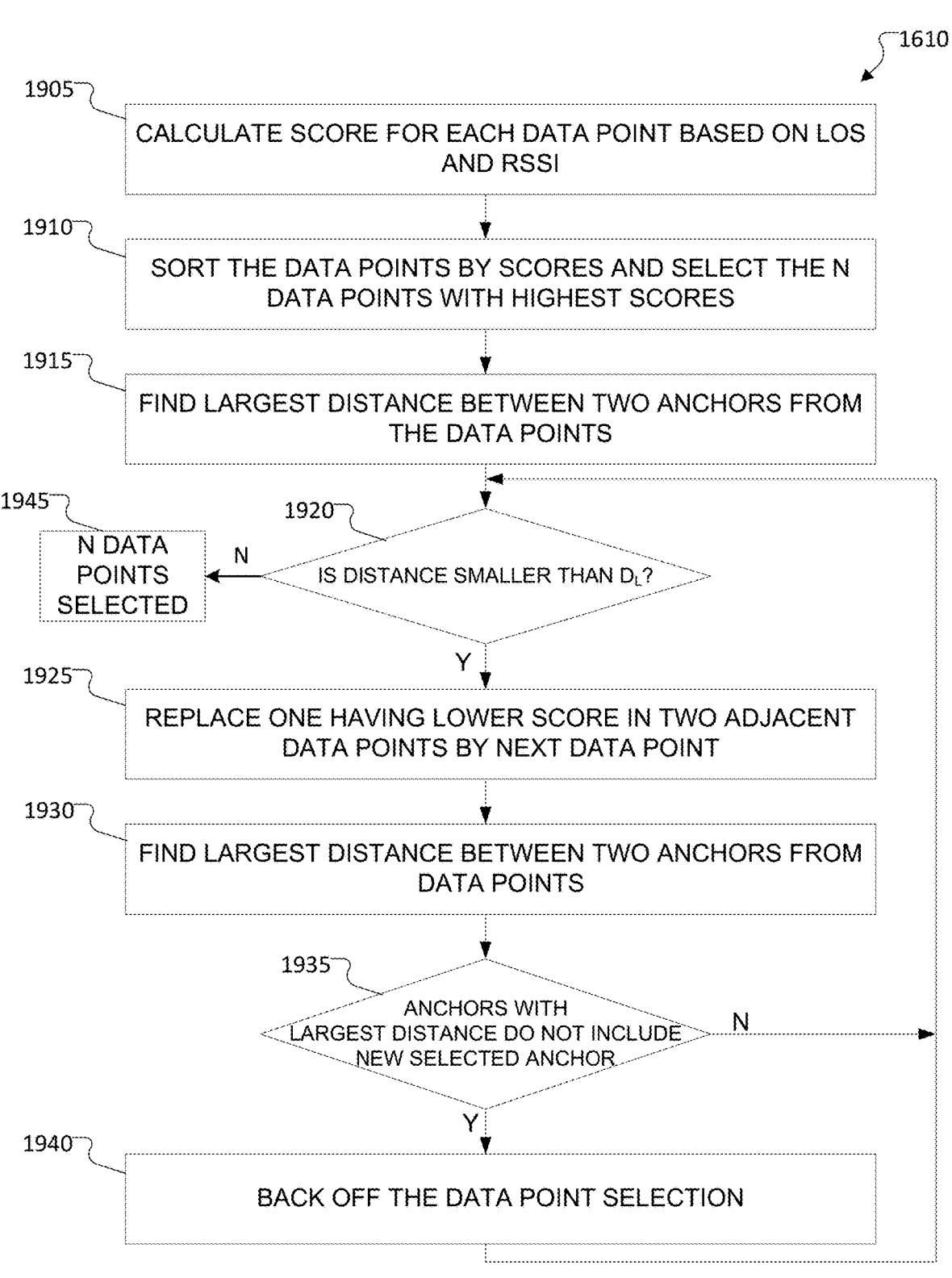
FIG. 19 illustrates another process for data point selection according to embodiments of the present disclosure.

FIG. 19 illustrates another process for data point selection according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server, a STA, or a mobile device.

In certain embodiments, a largest distance between two anchors is used as criterion instead of smallest distance. In operation 1905, the processing device calculates the score for each data point based on LOS and RSSI. The data points score is calculated from RSSI value and LOS status according to Equation 4 above, where $S_{rssi}$ is the assigned score by RSSI value and $S_{LOS}$ is the assigned score by LOS status. For $S_{rssi}$, the processing device can directly assign the RSSI dB value. For $S_{Los}$, Equation 5 above (e.g., K=10) can be used.

In operation 1910, the processing device sorts the data points by their score. Assuming N data points are to be selected, the processing device selects the N data points with highest scores. In operation 1915, the processing device checks a distance between two anchors. The criterion is to minimize the longest minimal distance. In operation 1920, if the largest distance is less than a predefined threshold $D_L$, then we start to replace the data point. Then, in operation 1925, the processing device replaces the data point with the lower score in the pair of minimal distance, by a data point with next highest score in the un-checked data point pool. Otherwise, in operation 1945, the current N data points will be the selected data points for operation 1610. After replacing the data point in operation 1920, the processing device re-checks the minimal distance again in operation 1930. In operation 1935, if the minimal distance is smaller than the previous minimal distance, then the processing device backs off the replacement in operation 1940. The processing device repeats operations 1920-1935 until the largest distance is no less than $D_L$ or all the data points have been checked.

Returning to FIG. 16, in operation 1615, the processing device generates ranging information for each selected data point. In certain embodiments, focus is placed on the localization with ranging information and the angle information may be ignored. If the data point includes TOF information, then the TOF information can be directly converted to ranging information by $R=T_{tof}*C$, where R is range, $T_{tof}$ is TOF information, C is speed of light. If the data point does not include TOF information, but includes CSI information, the processing device can calculate the TOF and eventually convert to ranging information by using a method disclosed in Y. Xie, J. Xiong, M. Li, and K. Jamieson, "mD-track: Leveraging multidimensionality in passive indoor Wi-Fi tracking," in Proc. MobiCom, 2019, pp. 8:1-8:16, the contents of which or incorporated in their entirety. If the data point only has RSSI, then R is determined according to:

$$R=f(RSSI_i-RSSI_{ref,i}) \qquad (6)$$

Here $RSSI_i$ is the RSSI value for ith anchor, $RSSI_{ref,i}$ is the reference RSSI obtained in calibration stage for ith anchor, f( ) is the look-up table to map calibrated RSSI to range. The look-up table can be previously generated by measurement data.

In operation 1620, the processing device maps the ranging information into location. To map the ranging information, the processing device can use a mapping method disclosed in K. K. Chintalapudi, A. Dhariwal, R. Govindan and G. S. Sukhatme, "Ad-hoc localization using ranging and sectoring", *IEEE Infocomm*, March 2004, the contents of which or incorporated in their entirety.

In certain embodiments, after the data point selection procedure in operation 1610 has been completed, the collaborative localization protocol can be subsequently performed with the selected anchors, without the excluded anchors, to reduce the overhead of the collaborative localization protocol. In certain embodiments, one or more the following may occur, which may require the data selection procedure to be performed again to update the set of STA anchors used to generate the location information: the target device moves a sufficiently large distance; one or more of the currently selected STA anchors move, or have been blocked; or one or more of the currently selected STA anchors are no longer available, due to another higher priority task the anchors need to perform which require them to stop supporting the collaborative localization.

Figure 20:
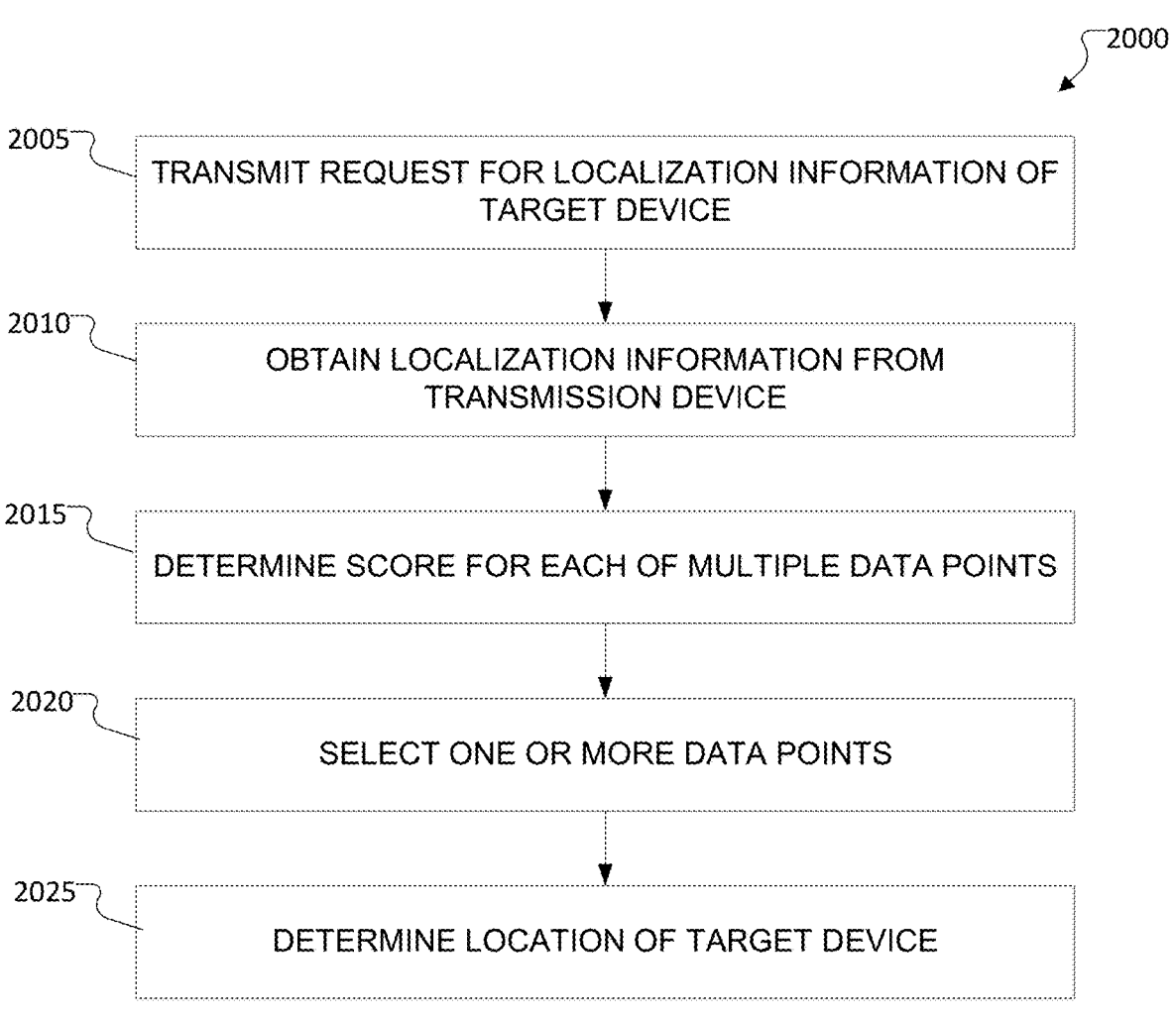
FIG. 20 illustrates a process for collaborative localization according to embodiments of the present disclosure.

FIG. 20 illustrates a process for collaborative localization according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a processor in a server, a STA, or a mobile device.

In operation 2005, a requesting device transmits a request for localization information to a reception device in a wireless communication network. In operation 2010, the requesting device obtains localization information from a transmission device in the wireless communication network. The location information can include multiple data points. In operation 2015, a processing device determines or attributes a score to each of the data points, where the score is based on a line-of-sight detection and a measure of signal quality. In operation 2020, the processing device selects data points from the localization information based on the respective scores. In operation 2025, the processing device determines a location of the target device based on the selected data points.

Certain embodiments provide a STA anchor device in the wireless communication network functions as the reception device and the transmission device, wherein the request for localization information is transmitted on a wireless channel established between the STA anchor device and the target device. Certain embodiments provide an AP in the wireless communication network is the reception device, and an STA anchor device in the wireless communication network is the transmission device. The AP can forward the request to the STA anchor device; and the STA anchor device transmits the localization information as a broadcast message that is intercepted by the target device. In certain embodiments, a STA anchor device in the wireless communication network is configured as the reception device, and an AP in the wireless communication network is configured as the transmission device. The target device can transmit the request as a broadcast message that is intercepted by the STA anchor. The STA anchor can transmit, in response to intercepting the broadcast message, the localization information to the AP. Additionally, the AP forwards the localization information to the target device.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

transmitting, by a requesting device to a reception device, a request for localization information of a target device in a wireless communication network, wherein the request for localization information is transmitted on a wireless channel established between a wireless (STA) anchor device and the target device;

obtaining, by the requesting device, the localization information from the STA anchor device in the wireless communication network, the localization information including multiple data points, wherein the STA anchor device communicatively coupled to an access point (AP) is configured to function as the reception device and a transmission device;

determining a score for each of the multiple data points, where the score is based on a sum of a line-of-sight score and a signal quality score, wherein determining the line-of-sight score comprises:

converting channel state information (CSI) to a time domain to generate a channel impulse response; and inputting the channel impulse response and signal quality score to a pre-trained machine learning engine to determine the line-of-sight score;

selecting one or more data points from the localization information based on the determined scores; and determining a location of the target device based on the selected one or more data points.

2. The method of claim 1, wherein the AP in the wireless communication network is the reception device, and the STA anchor device in the wireless communication network is the transmission device, wherein the AP is configured to forward the request to the STA anchor device, and wherein the STA anchor device is configured to transmit the localization information as a broadcast message.

3. The method of claim 1, wherein the STA anchor device in the wireless communication network is the reception device, the AP in the wireless communication network is the transmission device, wherein the request for localization information is transmitted as a broadcast message that is intercepted by the STA anchor device, wherein STA anchor device transmits, in response to intercepting the broadcast message, the localization information to the AP, and wherein the AP forwards the localization information to the target device.

4. The method of claim 1, wherein the requesting device comprises one of:

the target device; or an external mobile electronic device.

5. The method of claim 1, wherein the STA anchor device is the reception device and is fixed in a single location.

6. The method of claim 5, wherein the STA anchor device comprises one of: a television, a thermostat, a personal assistant, a game system, a sound system, an appliance, or a security camera.

7. An apparatus comprising:

a transceiver; and a processor configured to:

transmit, via the transceiver to a reception device, a request for localization information of a target device in a wireless communication network, wherein the request for localization information is transmitted on a wireless channel established between a wireless (STA) anchor device and the target device;

obtain the localization information from the STA anchor device in the wireless communication network, the localization information including multiple data points, wherein the STA anchor device is configured to function as the reception device and a transmission device;

determine a score for each of the multiple data points, where the score is based on a sum of a line-of-sight score and a signal quality score, wherein determining the line-of-sight score comprises:

converting channel state information (CSI) to a time domain to generate a channel impulse response; and inputting the channel impulse response and signal quality score to a pre-trained machine learning engine to determine the line-of-sight score;

select one or more data points from the localization information based on the determined scores; and determine a location of the target device based on the selected one or more data points.

8. The apparatus of claim 7, wherein the processor is further configured to transmit the request for localization information to an access point (AP) in the wireless communication network, wherein the AP is configured to forward the request to the STA anchor device, and wherein the STA anchor device is configured to transmit the localization information as a broadcast message.

9. The apparatus of claim 7, wherein the processor transmits the request for localization information as a broadcast message, wherein in response to intercepting the broadcast message, the STA anchor device transmits the localization information to an access point (AP), and wherein the AP forwards the localization information to the target device.

10. The apparatus of claim 7, wherein the apparatus comprises one of:

the target device; or an external mobile electronic device.

11. The apparatus of claim 7, wherein the STA anchor device is the reception device and is fixed in a single location.

12. The apparatus of claim 11, wherein the STA anchor device comprises one of: a television, a thermostat, a personal assistant, a game system, a sound system, an appliance, or a security camera.

13. A non-transitory computer readable medium comprising a plurality of instructions that, when executed by a processor of an electronic device, cause the processor to:

transmit, via a transceiver to a reception device, a request for localization information of a target device in a wireless communication network, wherein the request for localization information is transmitted on a wireless channel established between a wireless (STA) anchor device and the target device;

obtain the localization information from the STA anchor device in the wireless communication network, the localization information including multiple data points, wherein the STA anchor device is configured to function as the reception device and a transmission device;

determine a score for each of the multiple data points, where the score is based on a sum of a line-of-sight score and a signal quality score, wherein determining the line-of-sight score comprises:

converting channel state information (CSI) to a time domain to generate a channel impulse response; and inputting the channel impulse response and signal quality score to a pre-trained machine learning engine to determine the line-of-sight score;

select one or more data points from the localization information based on the determined scores; and determine a location of the target device based on the selected one or more data points.

14. The non-transitory computer readable medium of claim 13, wherein the instructions are further configured to cause the processor to transmit the request for localization information to an access point (AP) in the wireless communication network, wherein the AP is configured to forward the request to the STA anchor device, and wherein the STA anchor device is configured to transmit the localization information as a broadcast message.

15. The non-transitory computer readable medium of claim 13, wherein the instructions are further configured to cause the processor to transmit the request for localization information as a broadcast message, wherein in response to intercepting the broadcast message, the STA anchor device transmits the localization information to an access point (AP), and wherein the AP forwards the localization information to the target device.

16. The non-transitory computer readable medium of claim 13, wherein the STA anchor device is the reception device and is fixed in a single location.

17. The non-transitory computer readable medium of claim 16, wherein the STA anchor device comprises one of: a television, a thermostat, a personal assistant, a game system, a sound system, an appliance, or a security camera.

18. The method of claim 1, wherein the signal quality score is based on a received signal strength indicator (RSSI).

19. The apparatus of claim 7, wherein the signal quality score is based on an RSSI.

20. The non-transitory computer readable medium of claim 13, wherein the signal quality score is based on an RSSI.

* * * * *